(12) United States Patent
Bhadsavle et al.

(10) Patent No.: US 11,940,320 B1
(45) Date of Patent: Mar. 26, 2024

(54) COMPRESSING LOAD SIGNAL TRANSMISSIONS

(71) Applicant: Amazon Technologies, Inc., Seattle, WA (US)

(72) Inventors: Sarang Sandeep Bhadsavle, Seattle, WA (US); Alexander Eugene Choi, Seattle, WA (US); Graham Cyril Jordan, Edmonds, WA (US); Paul Eugene Munger, Seattle, WA (US); Robert M. Riggs, Winthrop, WA (US); Benjamin Hong Yee, Seattle, WA (US); Matthew Zimmer, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 356 days.

(21) Appl. No.: 17/358,617

(22) Filed: Jun. 25, 2021

(51) Int. Cl.
  *G01G 19/414* (2006.01)
  *G01G 23/18* (2006.01)
  *G06Q 10/087* (2023.01)

(52) U.S. Cl.
  CPC ......... *G01G 19/4144* (2013.01); *G01G 23/18* (2013.01); *G06Q 10/087* (2013.01)

(58) Field of Classification Search
  CPC ... G01G 19/4144; G01G 23/18; G06Q 10/087
  USPC .......................................................... 177/1
  See application file for complete search history.

(56) References Cited

U.S. PATENT DOCUMENTS

| 7,225,980 B2 | 6/2007 | Ku et al. |
| 7,949,568 B2 | 5/2011 | Fano et al. |
| 8,009,864 B2 | 8/2011 | Linaker et al. |
| 8,175,925 B1 | 5/2012 | Rouaix |
| 8,189,855 B2 | 5/2012 | Opalach et al. |
| 8,423,431 B1 | 4/2013 | Rouaix et al. |
| 8,630,924 B2 | 1/2014 | Groenevelt et al. |
| 8,688,598 B1 | 4/2014 | Shakes et al. |
| 9,473,747 B2 | 10/2016 | Kobres et al. |
| 10,121,121 B1 | 11/2018 | Bonet et al. |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Jacques M Saint Surin
(74) *Attorney, Agent, or Firm* — Athorus, PLLC

(57) ABSTRACT

A load sensor compares generated values of load signals to predicted values of the load signals. Where an error between a generated value and a predicted value is less than a threshold, a value of zero is transmitted by the load sensor to an external systems, in an encoded stream of bits, and the error are used to calculate a predicated value of a next load signal, such that insubstantial changes in loading resulting in small errors are not transmitted to the external system. Where an error between the generated value and the predicted value exceeds the threshold, however, a value representative of the error is transmitted to the external system, in an encoded stream of bits. The external system processes the stream of bits to calculate the error, to determine that an item has been placed on a storage system or removed therefrom, or to identify the item.

20 Claims, 17 Drawing Sheets

(56) References Cited

U.S. PATENT DOCUMENTS

| | | | |
|---|---|---|---|
| 10,198,710 B1* | 2/2019 | Hahn | G01G 19/4144 |
| 10,332,066 B1* | 6/2019 | Palaniappan | G01G 19/42 |
| 10,614,415 B1 | 4/2020 | Bonet et al. | |
| 10,810,540 B1* | 10/2020 | Gopal | G01G 19/42 |
| 10,891,586 B1* | 1/2021 | Kramarov | G06F 3/0447 |
| 11,514,766 B1* | 11/2022 | McDaniel | G08B 13/2485 |
| 2003/0002712 A1 | 1/2003 | Steenburgh et al. | |
| 2004/0181467 A1 | 9/2004 | Raiyani et al. | |
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2009/0121017 A1 | 5/2009 | Cato et al. | |
| 2009/0245573 A1 | 10/2009 | Saptharishi et al. | |
| 2011/0011936 A1 | 1/2011 | Morandi et al. | |
| 2012/0284132 A1 | 11/2012 | Kim et al. | |
| 2013/0076898 A1 | 3/2013 | Philippe et al. | |
| 2013/0253700 A1 | 9/2013 | Carson et al. | |
| 2014/0201042 A1 | 7/2014 | Meyer | |
| 2014/0224875 A1 | 8/2014 | Slesinger et al. | |
| 2014/0279294 A1 | 9/2014 | Field-Darragh et al. | |
| 2014/0362223 A1 | 12/2014 | LaCroix et al. | |
| 2015/0019391 A1 | 1/2015 | Kumar et al. | |
| 2015/0073907 A1 | 3/2015 | Purves et al. | |
| 2015/0083744 A1 | 3/2015 | Vogler et al. | |
| 2016/0048798 A1 | 2/2016 | Meyer et al. | |
| 2016/0328767 A1 | 11/2016 | Bonner et al. | |
| 2017/0147969 A1 | 5/2017 | Narsingh et al. | |
| 2017/0172315 A1 | 6/2017 | Hay | |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

* cited by examiner

ERRORS BETWEEN INPUT SIGNALS AND ESTIMATES GREATER THAN THRESHOLD $(xA)3 + (xB)3 + (xC)3 + (xD)3 = \Delta w3 =$

IDENTIFY ITEM BASED ON SUM OF ERRORS

COMPRESSING LOAD SIGNAL TRANSMISSIONS

BACKGROUND

Materials handling facilities such as warehouses or retail stores often store or display items on shelves or like storage systems. For example, a materials handling facility may include one or more shelves or other storage systems that are mounted to or suspended from walls, gondola racks, fixtures or other structural features. Items that are available to customers may be disposed upon such shelves, and stored individually or collectively (e.g., along with other like or identical items) thereon, in random or predetermined (or assigned) areas or spaces on such shelves, until one or more of the items is retrieved therefrom by a customer, an associate, or another staff member associated with the materials handling facility. A materials handling facility may also include any number of tables or platforms onto which items may be disposed, or any number of bars, hooks, or other like storage systems from which one or more inventory items may be suspended, until one or more of such items is retrieved therefrom.

Increases in processing power and network connectivity, and reductions in component size, have enabled computer-based systems to be utilized in connection with nearly every aspect of our daily lives. In bricks-and-mortar commerce, computer-based systems having one or more sensors have been integrated into traditional retail establishments in order to aid in theft prevention or inventory tracking.

Such sensors, however, have traditionally required hard-wired connections to power sources and communications systems or networks. Although some sensors may be configured for wireless communication, where sensors are utilized in traditional commercial applications, data is typically generated by such sensors at substantially high sampling rates. The use of large numbers of sensors in such applications may tend to overwhelm the available bandwidth of a wireless network, or occupy vast portions of available processing capacity for analysis.

DETAILED DESCRIPTION

Figure 1A:
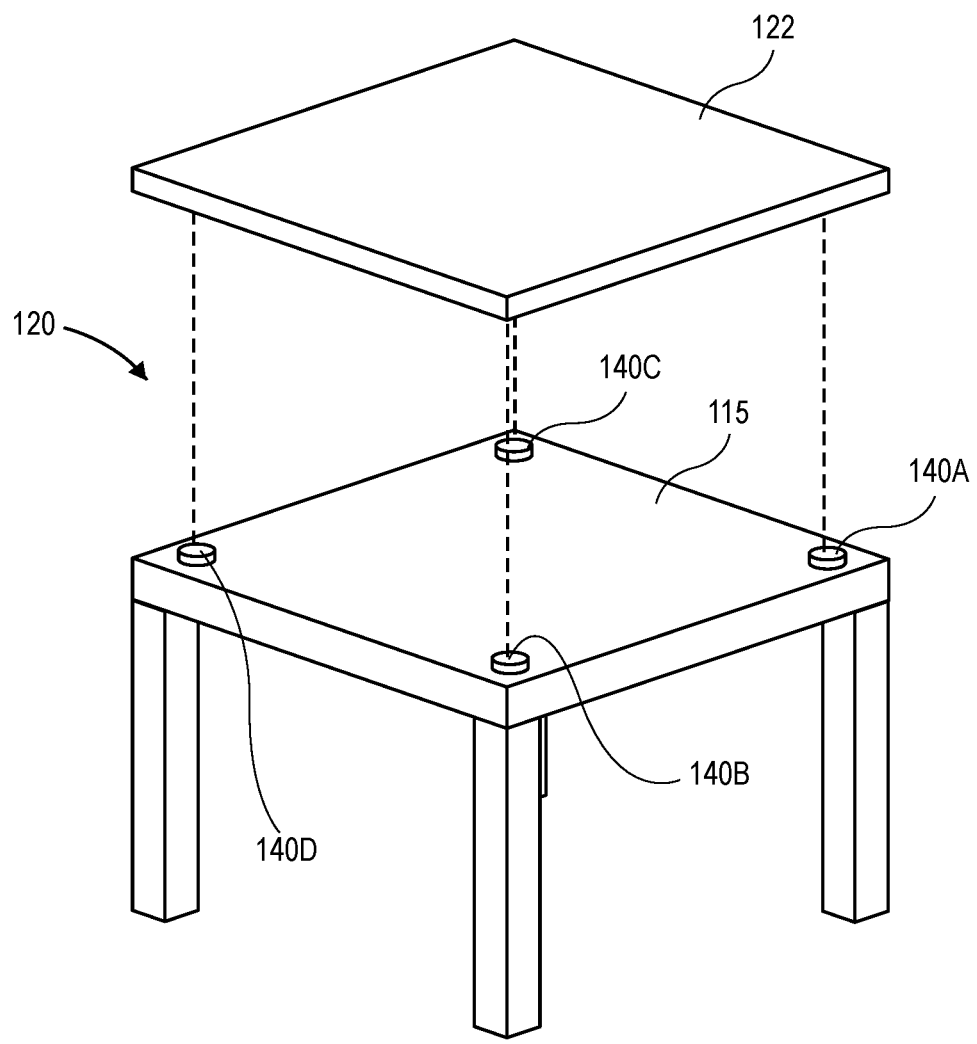
FIGS. 1A through 1I are views of aspects of one or more implementations of the present disclosure.

As is set forth in greater detail below, the present disclosure is directed to systems and methods for compressing load signal transmissions. More specifically, the systems and methods of the present disclosure are directed to reducing sizes and numbers of transmissions of data by load sensors provided in association with shelves, tables, platforms, bars, hooks or other systems for accommodating items, e.g., in inventory areas of a materials handling facility. The load sensors may be configured to generate signals representative of loading conditions at one or more locations or on one or more portions of such systems. A signal representative of a load on a load sensor that is captured at a given time may be compared to an estimate (or prediction) of a value of the signal or the load at the given time, or a reconstruction of the signal, that is calculated based on a previously calculated estimate (or prediction) of a value of a signal received at a previous time, or a load on the load sensor at the previous time. An error between an actual or measured value of a signal and an estimated value (or a predicted value) of the signal may be calculated.

If a calculated error exceeds a predetermined threshold, at least a portion of the calculated error may be encoded into a stream of bits, or streams of sets of bits, and transmitted over one or more networks to an external system for decoding. If the calculated error does not exceed the predetermined threshold, however, a value of zero may be encoded into a stream of bits, or a stream of sets of bits, and transmitted over the one or more networks to the external system. Where changes in loading sensed by a load sensor are infrequent or comparatively rare with respect to a sampling rate of the load sensor, a stream of bits may represent a large number of zeroes in series.

A calculated error that does not exceed a predetermined threshold may be incorporated into an equation for estimating (or predicting) a value of a signal or a load to be received at a next time, thereby enabling the error to be accumulated and carried forward in subsequent comparisons between estimated values (or predicted values) of signals representative of loads and actual values of signals representative of the loads. If an error that is subsequently calculated between an estimated value (or a predicted value) of a signal and an actual or measured value of the signal exceeds the predetermined threshold, a value representative of the calculated error may be encoded into a stream of bits, or streams of sets of bits, and transmitted to the external system. Otherwise, if the error does not exceed the predetermined threshold, another value of zero may be encoded into a stream of bits and transmitted to the external system. The error may be accumulated and carried forward again, and incorporated into the equation for estimating (or predicting) the value of the signal or the load to be received at a next time, until the error exceeds the predetermined threshold.

Values of zero or values representative of calculated errors may be transmitted in streams of bits that are encoded in a binary code, in a manner similar to or inspired by Golomb coding, and may include one or more features or values for representing negative values or numbers of zeroes included in the streams.

Referring to FIGS. 1A through 1I, views of components of one or more implementations of the present disclosure are shown. As is shown in FIG. 1A, a storage system 120 includes a plurality of load sensors 140A, 140B, 140C, 140D provided on a surface of a table 115, and a platform 122 resting on the load sensors 140A, 140B, 140C, 140D. The storage system 120 may be provided in a materials handling facility or in any other location or facility, and configured to enable access to items on a surface of the platform 122 that is aligned horizontally or at any other angle. Each of the load sensors 140A, 140B, 140C, 140D may be placed in locations near corners of the surface of the table 115 at finite distances from one another. The platform 122 may be utilized to support any number of items of any type thereon, including but not limited to food products (e.g., prepared foods, baked goods, produce or the like), office products, consumer electronics, home and garden products, hardware or tools, or any other items. Moreover, the platform 122 may further include one or more spaces or regions (e.g., lanes) that are designated or set aside for accommodating or storing one or more items of a discrete type. In some implementations, rather than resting on the table 115, the platform 122 may be provided in association with any number of walls or other structures along edges of the platform 122, e.g., normal to the platform 122, or at any other angle, and one or more of the load sensors 140A, 140B, 140C, 140D may be disposed between the platform 122 and such walls or other structures.

The storage system 120 may be utilized in any commercial space or facility that may be subject to any varying environmental conditions, such as periods of high or low levels of sunlight, high or low temperatures, high or low humidity levels, high or low barometric pressures, or the like. The table 115 and/or the platform 122 may be formed from any translucent or opaque suitable materials including but not limited to steel, plastics, acrylics or other sufficiently durable materials, and may, in some implementations, be treated with one or more substances (e.g., paints, powders, or the like).

The load sensors 140A, 140B, 140C, 140D may be any devices or systems for determining dead and/or live loading on the platform 122. For example, in some implementations, the load sensors 140A, 140B, 140C, 140D may include one or more capacitive sensors, force-sensing resistors, strain gages, load cells, piezoelectric sensors, inductive weight sensors, or any other type or form of device or system for generating electrical load signals in response to loading on the platform 122 or unloading from the platform 122. Such signals may be used to determine a mass or weight of objects placed on or removed from the platform 122, and, based on such masses or weights, identify one or more of such objects. Moreover, where locations of the load sensors 140A, 140B, 140C, 140D with respect to the platform 122 are known, the electrical load signals may be further used to determine locations where items are placed on the platform 122 or removed therefrom. For example, a mass or weight of an item may be determined as a sum of forces sensed by the load sensors 140A, 140B, 140C, 140D, less an accounting for a mass or weight of the platform 122, or any other items placed thereon (not shown). A location of an item on the platform 122 may be determined based on sums of forces sensed by pairs of the load sensors 140A, 140B, 140C, 140D, as well as distances between the pairs of the load sensors 140A, 140B, 140C, 140D, according to standard equilibrium principles.

Alternatively, in some implementations, the storage system 120 may include any number of load sensors, e.g., more or fewer than the four load sensors 140A, 140B, 140C, 140D shown in FIG. 1A. Moreover, in some implementations, the storage system 120 need not include a platform or any other substantially planar load surface. For example, where the storage system 120 includes one or more bars from which items may be hung or otherwise suspended, the storage system 120 may include two load sensors, e.g., one for each cable or other member from which the bars are suspended in tension, or one for each column, stanchion or other member by which the bars may be supported in compression. As another example, where the storage system 120 includes a hook from which items may be hung or otherwise suspended, the storage system 120 may include a single load sensor.

Figure 1B:
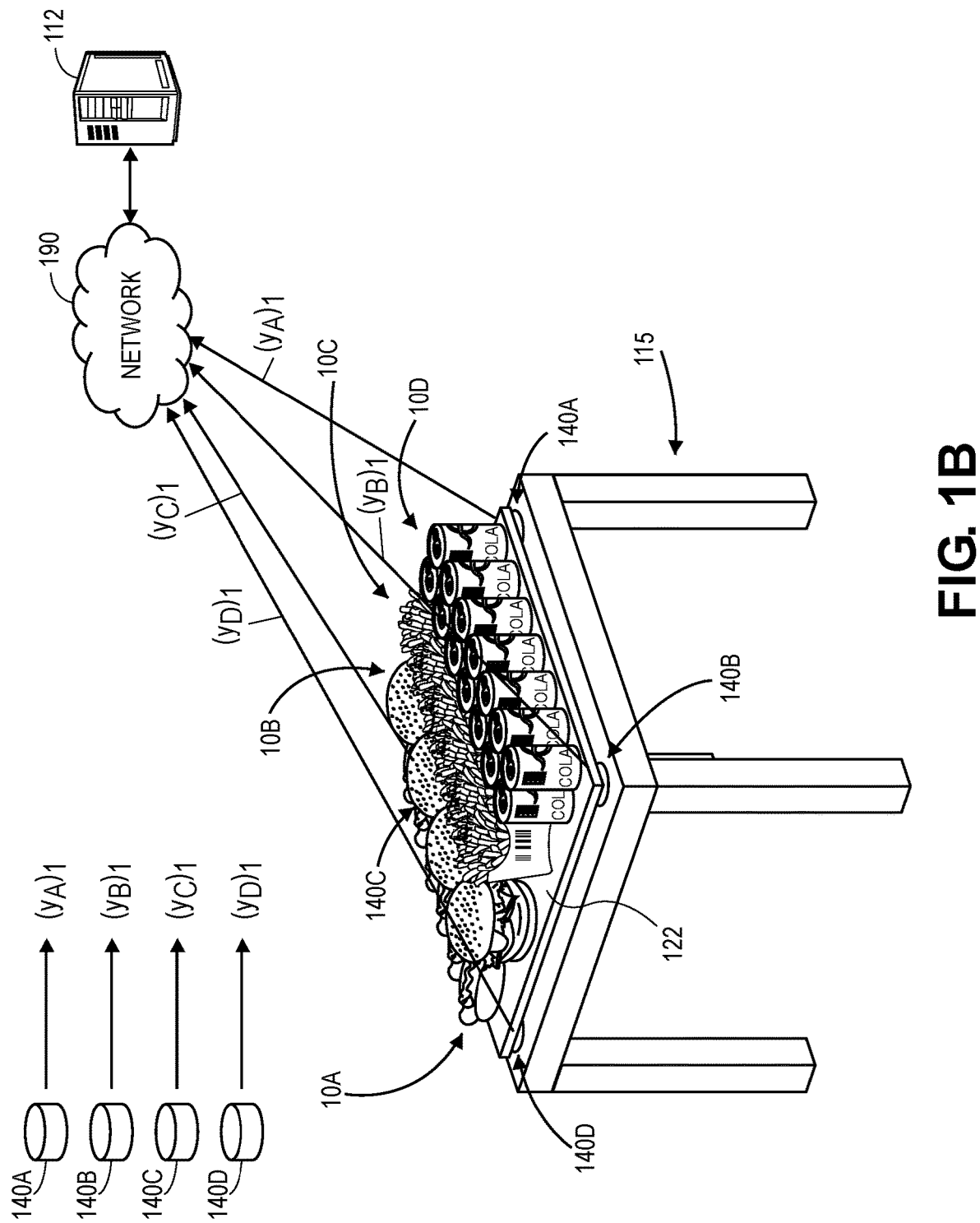

As is shown in FIG. 1B, a plurality of sets of items 10A, 10B, 10C, 10D are placed on the platform 122 in specified areas. The set of items 10A includes sandwiches or like foods, while the set of items 10B includes hamburgers or like foods, the set of items 10C includes appetizers such as French fries, and the set of items 10D includes cans of beverages. As is further shown in FIG. 1B, with the sets of items 10A, 10B, 10C, 10D placed on the platform 122, each of the load sensors 140A, 140B, 140C, 140D transmits a signal $(y_A)_1$, $(y_B)_1$, $(y_C)_1$, $(y_D)_1$ to an external system 112 over one or more networks 190, which may include the Internet in whole or in part. The load sensors 140A, 140B, 140C, 140D may be configured to communicate with the external system 112, with any other computer devices (not shown), or with one another, according to any wireless techniques, e.g., standard wireless protocols such as Bluetooth® or any Wireless Fidelity (or "Wi-Fi") protocol, or any other protocols.

The signals $(y_A)_1$, $(y_B)_1$, $(y_C)_1$, $(y_D)_1$ may be raw signals generated by the load sensors 140A, 140B, 140C, 140D or, alternatively, converted in form, e.g., to digital signals, or subjected to filtering prior to being transmitted to the external system 112, or by the external system 112 upon their receipt. Based on the signals $(y_A)_1$, $(y_B)$, $(y_C)_1$, $(y_D)_1$, the external system 112 may determine a total weight (or mass) of the sets of items 10A, 10B, 10C, 10D on the platform 122. In some implementations, such as where the signals $(y_A)_1$, $(y_B)_1$, $(y_C)_1$, $(y_D)_1$ are the first signals generated by the load sensors 140A, 140B, 140C, 140D after loading the items 10A, 10B, 10C, 10D on the platform 122, the signals $(y_A)_1$, $(y_B)$, $(y_C)_1$, $(y_D)_1$ may represent entire amounts of loads applied to each of the load sensors 140A, 140B, 140C, 140D.

In some implementations, the signals $(y_A)_1$, $(y_B)_1$, $(y_C)_1$, $(y_D)_1$ may be encoded in a binary code, in a manner similar to or inspired by Golomb coding, and may include one or more features or values for representing negative values or numbers of zeroes included in such signals. For example, the binary code may include one or more digits indicating whether the signals represent values of zero, or non-zero values, as well as one or more digits indicating whether the signals represent positive or negative values. The binary code may further enable a series of zero values to be strung together and represented in one or more common signals. The binary code may also permit any value to be represented in multiple sets of code, which may be processed independently and added together or aggregated when received by the external system 112.

Figure 1C:
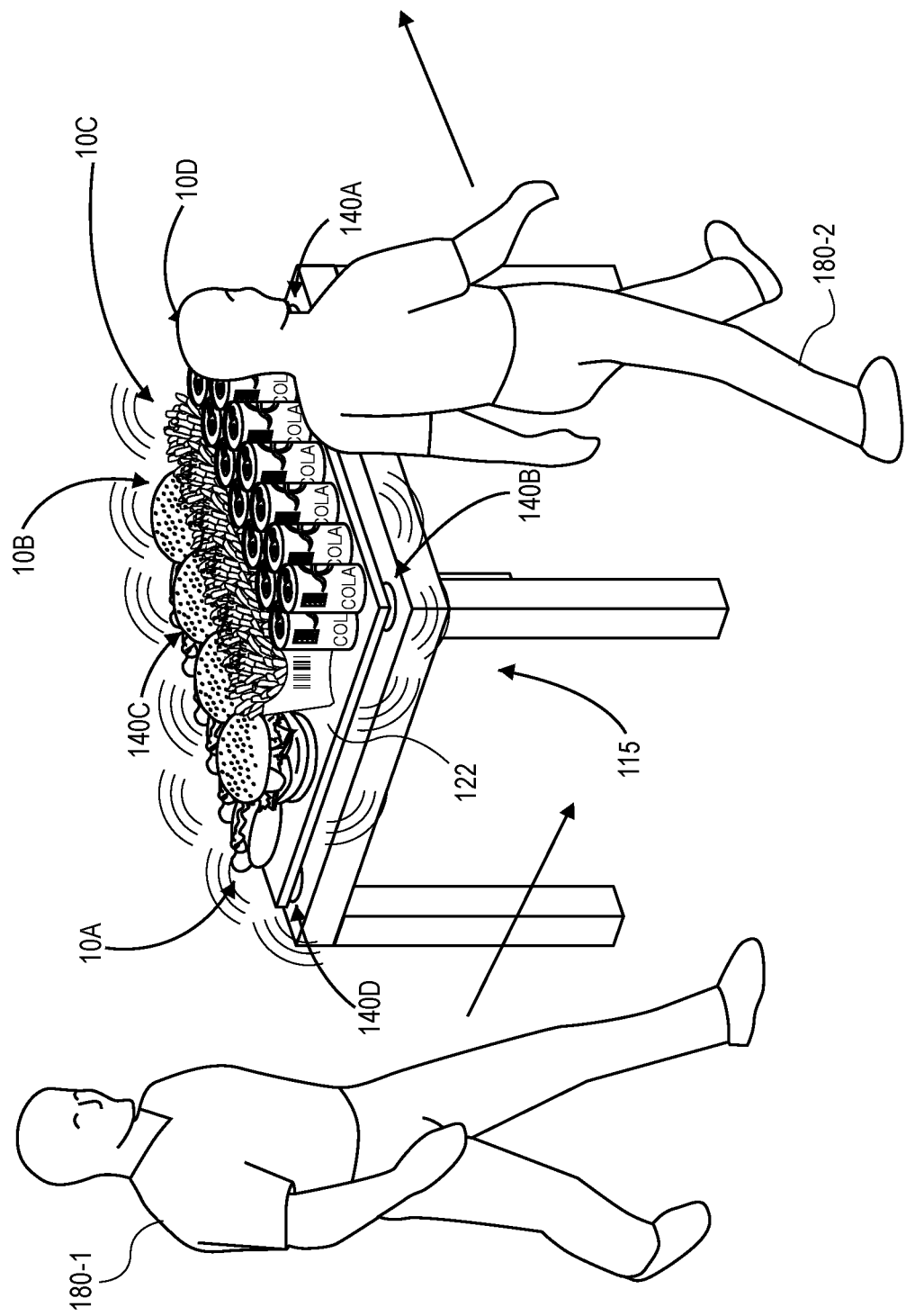

As is shown in FIG. 1C, one or more of the load sensors 140A, 140B, 140C, 140D of the storage system 120 may experience vibrations, shocks or other effects from external sources during normal operations. For example, vibrations or shocks may result from motion of objects near the table 115, including but not limited to a pair of customers 180-1, 180-2 (or associates, workers or other actors), who may walk near the table 115 or platform 122, or come into incidental contact with the table 115 or the platform 122. Alternatively, vibrations or shocks may result from any other activity occurring within a vicinity of the storage system 120.

Figure 1D:
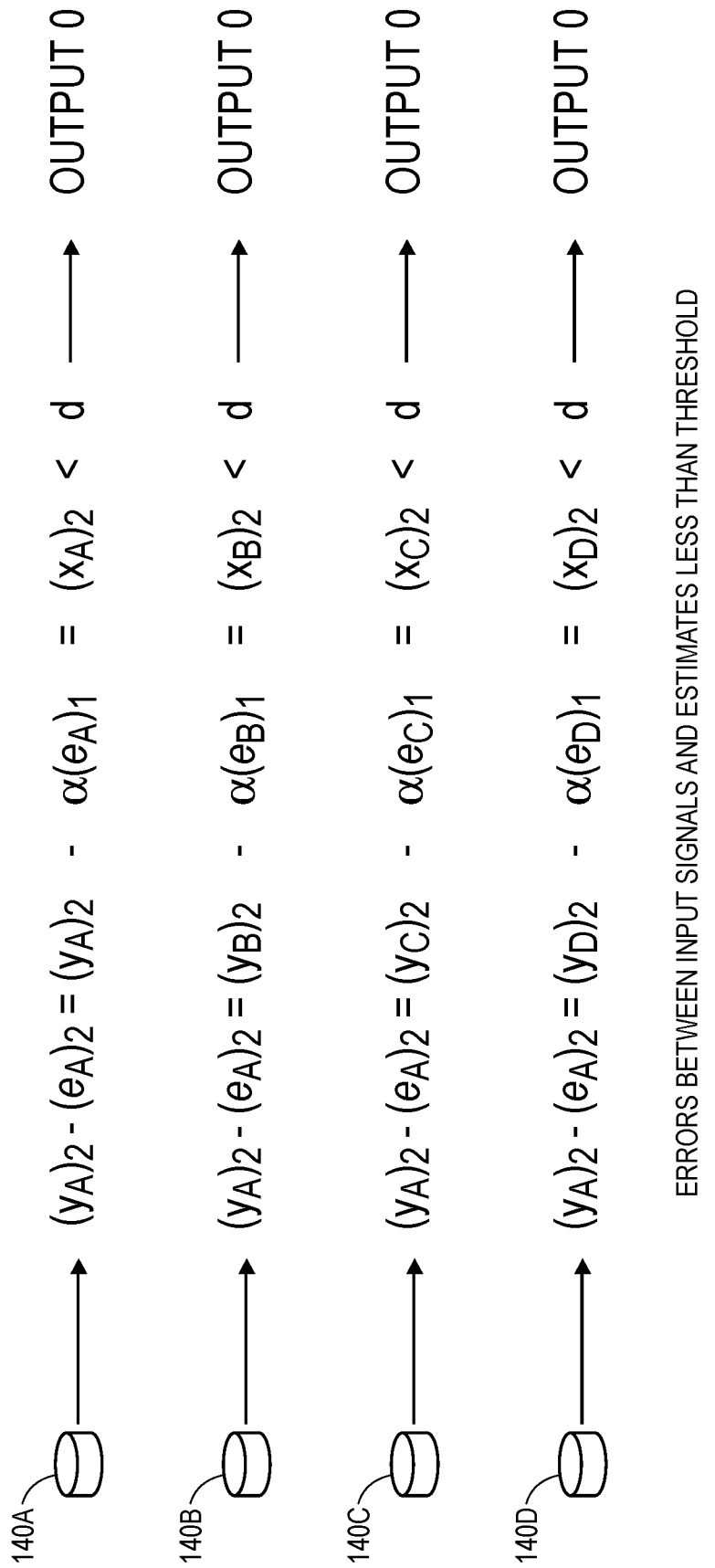

In accordance with implementations of the present disclosure, a value of a load signal generated by a load cell or load sensor of a storage system at a given time may be compared to an estimate e of the load signal, which may itself be calculated based on a product of a constant α and a prior estimate e of a previously generated load signal. If an error determined based on a difference between an actual or measured value of the load signal and the estimate of the load signal exceeds a threshold, at least a portion of the error may be encoded into a stream of bits and transmitted to an external system, which may interpret the stream of bits and record a change in loading on the storage system. If the error exceeds the threshold, the error may be encoded into a stream of bits and transmitted to an external system, which may interpret the stream of bits and record a change in loading on the storage system. As is shown in FIG. 1D, the load sensors 140A, 140B, 140C, 140D generate load signals $(y_A)_2$, $(y_B)_2$, $(y_C)_2$, $(y_D)_2$ in response to the vibrations or shocks due to motion within the vicinity of the storage system 120 shown in FIG. 1C. As is further shown in FIG. 1D, an error $(x_A)_2$ is calculated as a difference between the load signal $(y_A)_2$ captured by the load sensor 140A and a predicted value (or an estimated value) of the load signal $(e_A)_2$, or $(x_A)_2 = (y_A)_2 - (e_A)_2 = (y_A)_2 - \alpha(e_A)_1$. Where the load signal $(y_A)_1$ shown in FIG. 1B was the first load signal generated by the load sensor 140A, e.g., upon an initial loading or installation of items onto the platform 122, a value of the initial estimate $(e_A)_1$ may be selected at random, based on an expected value of the load signal $(y_A)_1$, or on the load signal $(y_A)_1$ itself.

Likewise, as is also shown in FIG. 1D, errors $(x_B)_2$, $(x_C)_2$, $(x_D)_2$ may be calculated as differences between the load signals $(y_B)_2$, $(y_C)_2$, $(y_D)_2$ captured by the respective load sensors 140B, 140C, 140D and predicted values (or estimated values) of such load signals $\alpha(e_B)_1$, $\alpha(e_C)_1$, $\alpha(e_D)_1$, or $(x_B)_2 = (y_B)_2 - (e_B)_2 = (y_B)_2 - \alpha(e_B)_1$, $(x_C)_2 = (y_C)_2 - (e_C)_2 = (y_C)_2 - \alpha(e_C)_1$ and $(x_D)_2 = (y_D)_2 - (e_D)_2 = (y_D)_2 - \alpha(e_D)_1$.

Figure 1E:
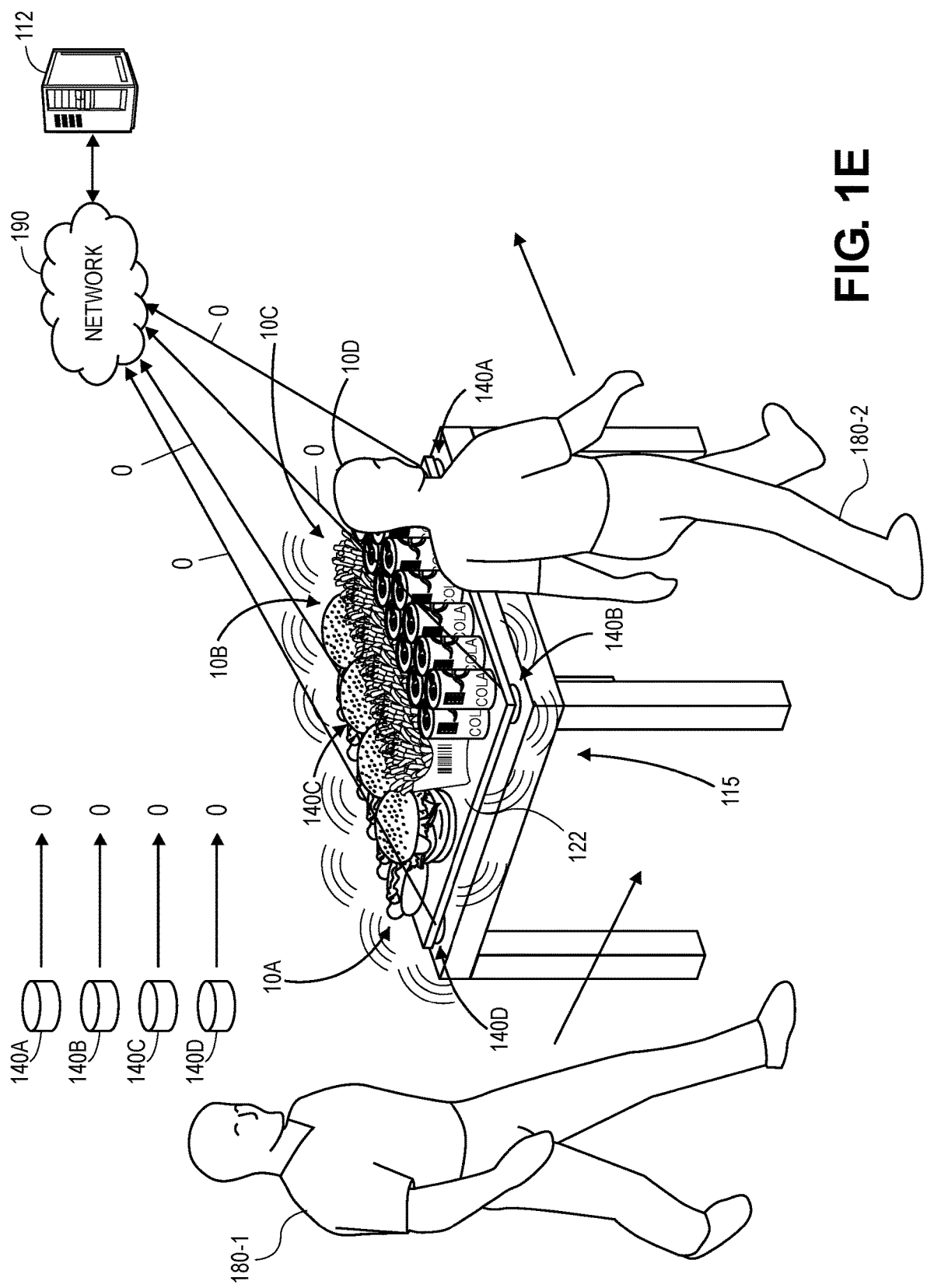

As is shown in FIGS. 1D and 1E, where the errors between the actual or measured values of the load signals $(y_A)_2$, $(y_B)_2$, $(y_C)_2$, $(y_D)_2$ and the predicted values of the load signals $(e_A)_2$, $(e_B)_2$, $(e_C)_2$, $(e_D)_2$ are less than a threshold d, each of the load sensors 140A, 140B, 140C, 140D outputs a signal representing a value of zero, and transmits the signal to the external system 112 over the one or more networks 190, indicating that loads on the load sensors 140A, 140B, 140C, 140D remain unchanged. Where the changes in loading sensed by the load sensors 140A, 140B, 140C, 140D and represented by the errors are substantially small, the load sensors 140A, 140B, 140C, 140D transmit signals representing values of zero, and each of the load sensors 140A, 140B, 140C, 140D stores the errors for use in estimating a value of a next load signal to be generated by the respective load sensors 140A, 140B, 140C, 140D.

Figure 1F:
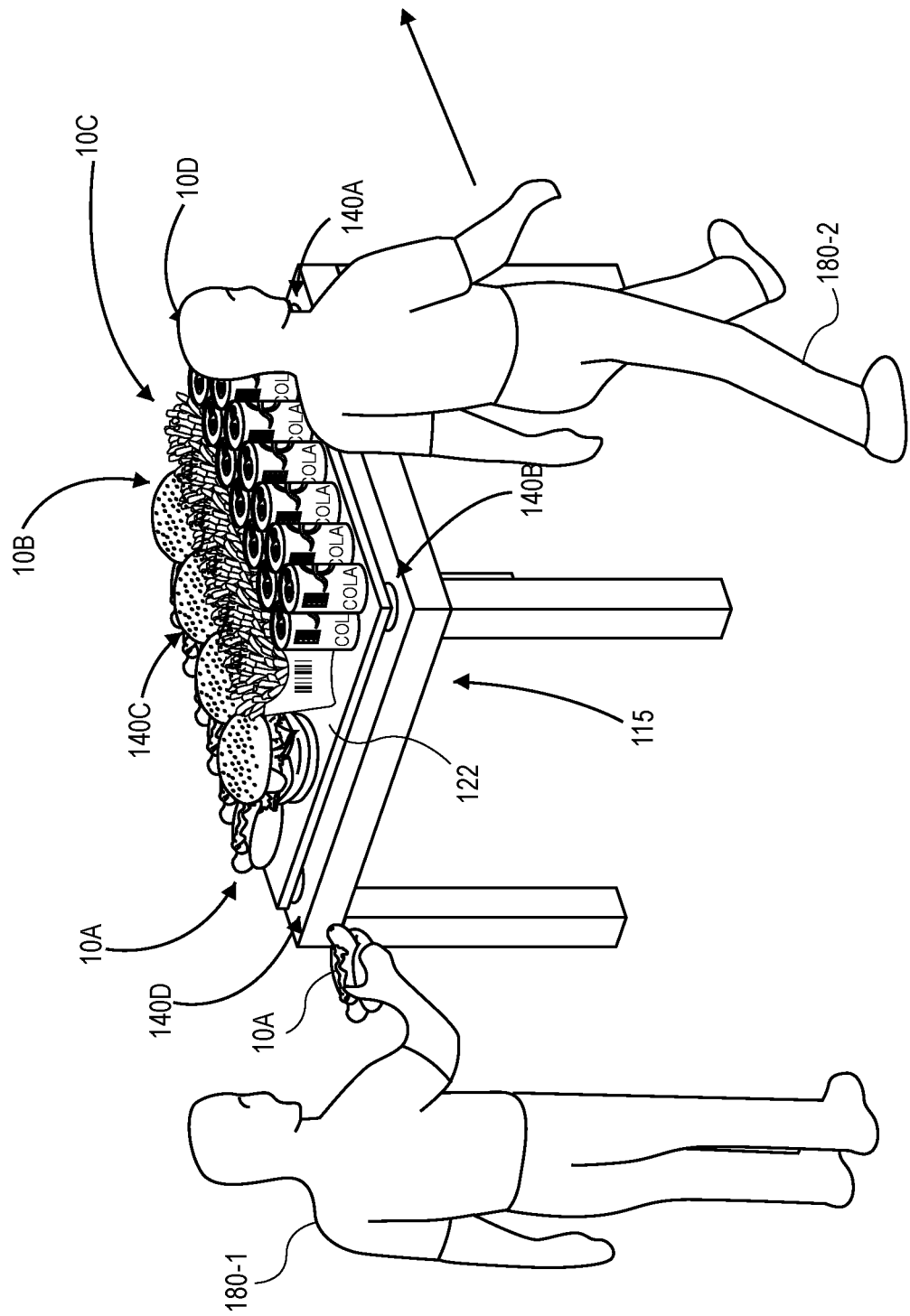
Figure 1G:
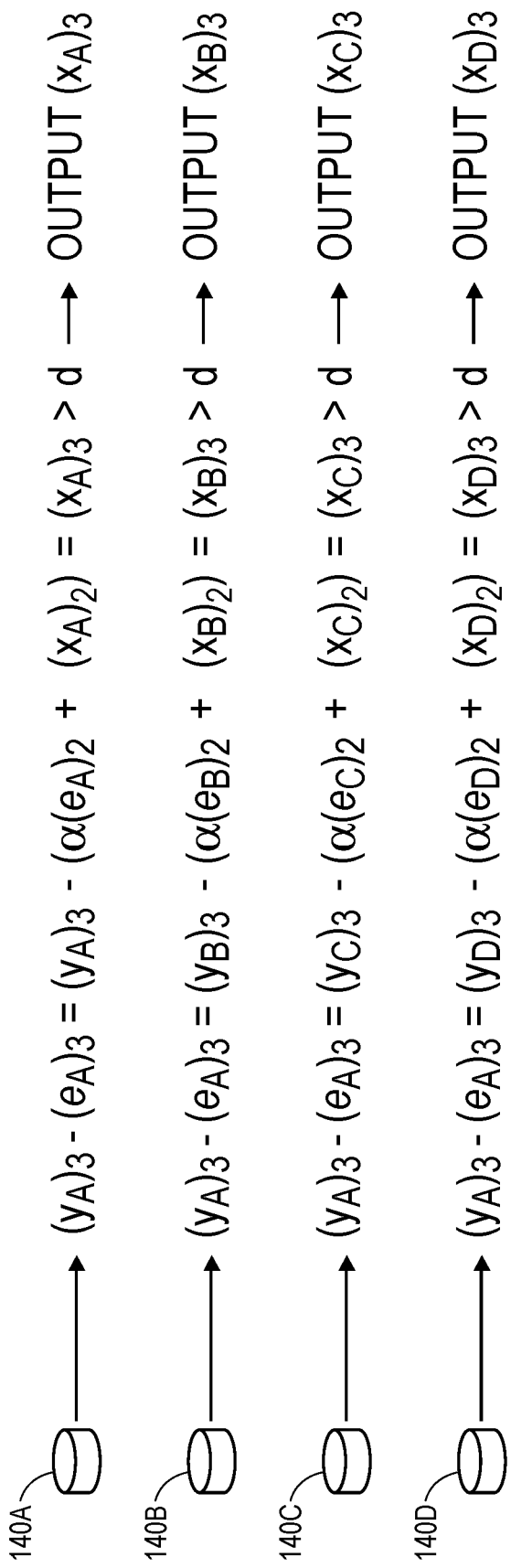

As is shown in FIGS. 1F and 1G, when the customer 180-1 removes one of the items 10A, e.g., one of the sandwiches, from the platform 122, one or more of the load sensors 140A, 140B, 140C, 140D of the storage system 120 sense changes in the loading, and generate load signals $(y_A)_3$, $(y_B)_3$, $(y_C)_3$, $(y_D)_3$ in response to such changes. As is further shown in FIG. 1G, an error $(x_A)_3$ is calculated as a difference between the load signal $(y_A)_3$ captured by the load sensor 140A and an estimate e, or a predicted value, of the load signal $(e_A)_3$, or $(x_A)_3 = (y_A)_3 - (e_A)_3$. The predicted value of the load signal $(e_A)_3$ may be calculated based on a sum of a product of a constant $\alpha$ and a prior estimate e of a previously generated load signal and the previously calculated error for the load sensor 140A, or $(x_A)_3 = (y_A)_3 - (\alpha(e_A)_2 + (x_A)_2)$.

Likewise, as is also shown in FIG. 1G, errors $(x_B)_3$, $(x_C)_3$, $(x_D)_3$ may be calculated as differences between the load signals $(y_B)_3$, $(y_C)_3$, $(y_D)_3$ captured by the respective load sensors 140B, 140C, 140D and sums of products of the constant $\alpha$ and the predicted values of such load signals $\alpha(e_B)_2$, $\alpha(e_C)_2$, $\alpha(e_D)_2$, and the errors previously calculated for the load sensors 140B, 140C, 140D, or $(x_B)_2$, $(x_C)_2$, $(x_D)_2$, such that $(x_B)_3 = (y_B)_3 - (\alpha(e_B)_2 + (x_B)_2)$, $(x_C)_3 = (y_C)_3 - \alpha(e_C)_2 + (x_C)_2)$ and $(x_D)_3 = (y_D)_3 - (\alpha(e_D)_2 + (x_D)_2)$.

Figure 1H:
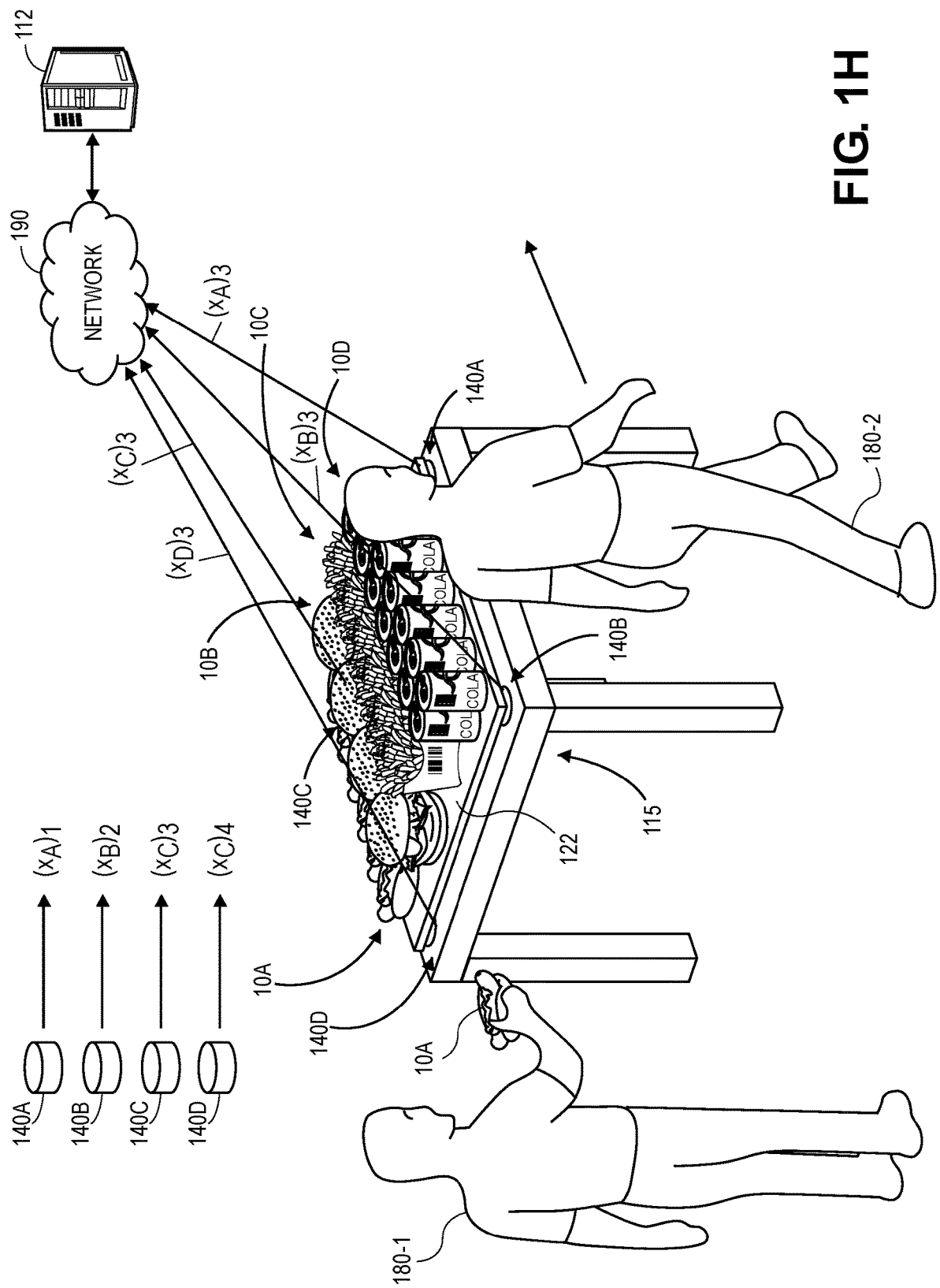

As is shown in FIGS. 1G and 1H, where the errors $(x_A)_3$, $(x_B)_3$, $(x_C)_3$, $(x_D)_3$ between the actual or measured values of the load signals $(y_A)_3$, $(y_B)_3$, $(y_C)_3$, $(y_D)_3$ and the predicted values of the load signals $(e_A)_3$, $(e_B)_3$, $(e_C)_3$, $(e_D)_3$ are not less than the threshold d, the load sensors 140A, 140B, 140C, 140D transmit signals representing the errors $(x_A)_3$, $(x_B)_3$, $(x_C)_3$, $(x_D)_3$ to the external system 112 over the one or more networks 190. The signals representing the errors $(x_A)_3$, $(x_B)_3$, $(x_C)_3$, $(x_D)_3$ may be encoded in the same binary code as the signals shown in FIG. 1E, or in a different manner. In some implementations, the signals that are encoded and transmitted may represent multiples of the threshold d, e.g., one or more values of the threshold d. In such implementations, each of the load sensors 140A, 140B, 140C, 140D may store any portions of the errors in excess of the multiples of the threshold d for use in estimating a value of a next load signal to be generated by the respective load sensors 140A, 140B, 140C, 140D.

Figure 1I:
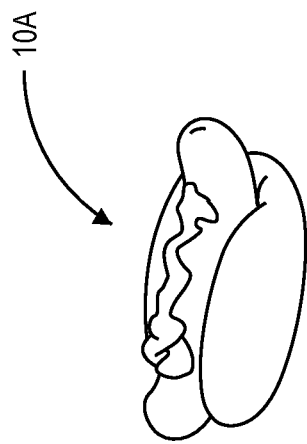

As is shown in FIG. 1I, upon receiving the signals representing the errors $(x_A)_3$, $(x_B)_3$, $(x_C)_3$, $(x_D)_3$, the external system 112 may determine a change in loading on the platform 122, or $\Delta w_3$, as a sum of the errors $(x_A)_3$, $(x_B)_3$, $(x_C)_3$, $(x_D)_3$. Moreover, once a mass or a weight corresponding to the change in loading on the platform 122, or $\Delta w_3$, is determined, the mass or weight may be compared to an index, record or look-up table associating items with their respective masses or weights, and used to identify the item 10A. Where the change in loading is determined to be negative, an item having a mass or a weight corresponding to $\Delta w_3$ may be presumed to have been removed from the platform 122. If the change in loading had been determined to be positive, an item having a mass or a weight corresponding to $\Delta w_3$ would have been presumed to have been placed on the platform 122.

In commercial settings, such as within warehouses, fulfillment centers, retail establishments or other materials handling facilities, shelves, bars, hooks or other storage systems are widely used for storing items on a short-term or a long-term basis, and are particularly valuable for their simplicity of design and ease of access. Determining the contents of an inventory location such as a shelf, a bar or a hook, or determining when such contents have changed, are persistent challenges or limitations that impact their utility and value in many situations. Traditionally, inventory levels have been determined and tracked by visual inspection, or through the use of radiofrequency identification (or "RFID") transmitters and receivers provided in association with the items and the shelves, respectively, e.g., by equipping shelves with RFID readers or sensors, or by incorporating RFID tags or emitters into items or their packaging. The use of RFID technology is effective but expensive, however, as each shelf must be provided with an RFID reader or sensor in close proximity, and each item to be stored on the shelf must be equipped with an RFID tag or emitter.

Many items may be identified by their respective weights. Using weight for inventory tracking is particularly reliable for inventory control and management because weight is an immutable characteristic that does not readily change, and because identical or like items typically have identical or like weights. For example, a combination of three discrete items has the same net weight regardless of the order or configuration in which such items are stacked, laid or aligned on a shelf. Moreover, unlike a visual appearance, which may vary based on perspective or be easily confused, weights of items are typically both fixed and unique.

Items that are stored on a shelf or another storage system, or changes in the number or type of such items, may be identified based on the weight of loads on the shelf or other storage system, or based on the weights of items that are placed onto or removed from the shelf or other storage system. In general, tracking items by their weight involves primary events such as removing an item from a shelf, placing the item onto a scale, determining a mass or weight of the item, and utilizing information regarding the mass or weight for one or more other purposes.

However, shelves or other storage systems that are outfitted with load sensors or other equipment for determining weights or masses are typically large and complex systems that are not readily transported and do not frequently change. For example, a typical shelf that includes load sensors is typically hard-wired with power sources and network connections within a frame of a shelving unit. Once such a shelving unit or like storage system is assembled, installed and calibrated, the shelving unit is rarely moved or reconfigured. Therefore, traditional shelves or other storage systems that are outfitted with network-connected load sensors are typically unable to be moved or easily modified for use with seasonal or temporarily relevant items, e.g., items that are on sale or are otherwise subject to one or more promotions. Moreover, such shelving units may also not be readily used in hot, cold, wet, dry or other adverse environmental conditions.

One solution to the literal or figurative rigidity of such shelves or storage systems and their hard-wired connections is to provide load sensors that are self-powered and configured for wireless communication with one or more external systems. For example, a load sensor may include not only a load cell but also one or more batteries or other power sources, as well as a circuit board having any number of processors, transistors, transducers, transceivers or any other components. Where the load sensors are programmed to generate and transmit data at rates of hundreds or thousands of bytes per second, however, wireless communication equipment such as transceivers, routers, or other networked components may be flooded with excessive amounts of data that tests the bounds of their bandwidth, or overwhelmed by demands to capture, process, interpret and act upon such data in real time or near-real time. Furthermore, because loading on a shelf or another storage system in a commercial environment remains substantially constant for most of the time that the shelf or the other storage system is accessible to customers, receiving substantially constant values representative of the loading condition is frequently unnecessary.

The systems and methods of the present disclosure are directed to compressing load signal transmissions, e.g., wireless transmissions of load signals by load sensors provided in association with one or more storage systems. In accordance with implementations of the present disclosure, a storage system may feature a platform or another loading surface, and load sensors provided in association with the loading surface that are configured to generate and transmit load signals indicative of forces sensed thereby. Where a storage system includes a plurality of load sensors (e.g., load cells), a mass of items on a platform or another loading surface may be determined based on a sum of the masses or weights calculated based on the load signals that are generated and transmitted thereby.

The load sensors of the present disclosure may be provided in self-contained systems having housings including one or more load cells or other load-sensing systems, power sources, circuits or boards (e.g., printed circuit boards) having transmitters and/or receivers for communicating with one another, or with one or more external computer systems. The load sensors of the present disclosure may be configured to not only generate raw load signals, and to convert or filter such signals, but also to estimate or predict values of the load signals, and to compare the load signals to the estimated or predicted values of such load signals. Errors are calculated based on differences between the generated load signals, e.g., converted and/or filtered load signals, and the estimated or predicted values of the load signals.

Where an error exceeds a predetermined threshold, a load sensor may transmit at least a portion of the error over one or more networks to an external computer system. For example, in some implementations, where the error equals or exceeds a multiple of the predetermined threshold, e.g., one of the predetermined threshold, or two or more of the predetermined threshold, the multiple of the predetermined threshold may be transmitted to the external system, and an amount or portion of an error that exceeds the multiple of the predetermined threshold may be accumulated and incorporated into an equation for estimating a value of a load signal to be received at a next time, until the error exceeds the predetermined threshold.

An error in excess of a predetermined threshold may indicate that a shopping event has occurred, e.g., a placement of one or more items on a shelf or another storage system, or a removal of one or more items from the shelf or other storage system. A value representative of the error may be used to identify the one or more items that were placed thereon or removed therefrom. For example, a difference between a load signal generated by a load sensor at a given time and a predicted value of the load signal at the given time may be indicative of a substantial change in loading on the load sensor, or on a shelf or another storage system at the given time. An item having a weight equal to the change in loading may be determined to have been placed thereon if the change is positive and removed therefrom if the change is negative.

Conversely, an error below the predetermined threshold may be representative of vibrations, shocks or other effects on a load sensor that do not result from a shopping event, e.g., a placement of any items on a shelf or another system, or a removal of any items from the shelf or the other system. A value of an error that is not indicative of a substantial change in loading on a shelf or another storage system need not be transmitted to an external computer system. Instead, a value of zero (e.g., an indication that loading on the shelf or the other storage system has not changed) is transmitted to the external system, and the value of the error may be accumulated and incorporated into an equation for estimating a next value of a load signal to be generated by the load sensor at a next time. For example, where an error indicates or is representative of small variations in load signals, such as variations resulting from damping vibrations of a shelf or another storage system, the small variations may be likely to dissipate, and the error may be likely to disappear, even as the loading on the shelf or the other storage system remains unchanged.

By selectively transmitting only values that are representative of substantial changes in loading on a load sensor, and not transmitting values indicating insignificant, temporary or unrelated changes in load signals generated by the load sensor, amounts of data transmitted by a load sensor to an external computer system, and processing power required to generate or process the data, may be significantly reduced.

Moreover, values of data that are transmitted by load sensors may be quantized, or converted into streams of bits, that may be encoded by the load sensors and decoded by an external system that receives and processes the streams in order to determine changes in loading sensed by each of the load sensors, or net changes in loading sensed by all of such sensors. Values of data may be quantized into sets of bits having designated values that may be interpreted with respect to a threshold and transmitted to represent a change in loading by respective sets of bits. For example, where a sensed change in loading has a value of twenty thresholds, or twenty in any other units, the sensed change may be represented by transmission of a first set of bits representing a value of sixteen and a second set of bits representing a value of four. The first set of bits and the second set of bits may be decoded and interpreted to determine that the sets of bits represent sixteen and four, respectively, and added to determine the value of twenty. Alternatively, where a sensed change in loading has a value of thirty-one, in any units, the sensed change may be represented by a transmission of a first set of bits representing a value of thirty-two and a second set of bits representing a value of negative one. The first set of bits and the second set of bits may be decoded and interpreted to determine that the sets of bits represent thirty-two and negative one, respectively, and added to determine the value of thirty-one.

In some implementations, streams of bits may be encoded in a binary code, in a manner similar to or inspired by Golomb coding, and may include one or more features or values for representing negative values or numbers of zeroes included in the stream. Where changes in loading sensed by a load sensor are infrequent or comparatively rare with respect to a sampling rate, numbers of zeroes included within a stream of bits may be quite common.

In order to utilize a storage system of the present disclosure, a plurality of load sensors may be provided in association with a shelf, a table, a platform, a bar, a hook, or another storage system in an inventory location. Loads are applied to each of the load sensors, which may be configured to communicate with an external computer device over one or more networks, e.g., by Bluetooth®, Wi-Fi, or in any other manner. Alternatively, a storage system may be manufactured or assembled as an integral unit including the load sensors, as well as any other loading surface, and one or more circuit boards or power sources.

The load sensors may be electrical load signals indicative of the dead and/or live loading thereon, including masses or weights of a platform or another loading surface or system and any items accommodated thereon. The load sensors may include one or more capacitive sensors, force-sensing resistors, strain gauges, load cells, inductive weight sensors, or any other type or form of device or system for generating electrical load signals. Moreover, where locations of the load sensors are known, electrical load signals may be further used to determine locations where items are placed on the platform or removed therefrom.

Load sensors may be provided in any spatial arrangement, and in association with storage systems of any shape or size, in accordance with the present disclosure. Furthermore, in some implementations, a platform need not be required, and a box, a bucket, a kiosk, a pallet, a vat, a vessel or any other container or system may be placed directly on a plurality of load sensors, which may generate and transmit electrical load signals indicative of the loading thereon at pulsed intervals or continuously. Changes or variations in loading, as determined from such signals, may be used to calculate a mass or weight of one or more items that have been placed onto a storage system or removed therefrom, or a location at which the items have been placed thereon or removed therefrom, and a transaction associated with such items may be attributed to a customer accordingly.

Any number of implementations of the storage systems disclosed herein may be utilized in tandem with one another, and may be configured to communicate with one or more external computer devices or systems regarding any number of items provided thereon. An addition of an item to a storage system, or a removal of an item from the storage system, may be determined based on changes or variations in net forces sensed by load sensors collectively, or by changes or variations in the net forces sensed by each of the load sensors individually. For example, load sensors of the present disclosure may be configured to determine a total weight, a change or a variation in weight, and a position of a change or a variation in weight on a platform or surface.

Where a platform or other surface having one or more items thereon is supported in equilibrium by load sensors, a total weight of the items is determined by a net total load sensed by the load sensors (e.g., a total load sensed by such sensors, less a weight of the platform). Additionally, because the platform is supported by the load cells in equilibrium, individual loads sensed by such sensors may be used to determine a center of gravity of the loads. Thus, in accordance with the present disclosure, when each item is placed in a given location on a platform, the weight and the center of gravity (which corresponds to the given location) of the item may be determined based on the individual loads sensed by each of the load sensors. In some implementations, the location of an item on a platform may be determined using a pair of load sensors disposed near opposite ends of the platform, and may thus be defined as a common line or line segment having a first distance from one of the load sensors and a second distance from another of the load sensors. In some other implementations, a location of an item may be determined using multiple pairs of load sensors disposed beneath a platform, and may thus be defined as an intersection of two or more of such lines or line segments. Moreover, once a mass or a weight of an item is determined, the mass or weight may be compared to an index, record or look-up table associating items with their respective masses or weights, and used to identify the item that was placed at the location.

Those of ordinary skill in the pertinent arts will recognize that an object in static equilibrium satisfies the following conditions. First, a vector sum of all external forces acting on the object must be zero. Second, a sum of torques due to all external forces acting on the object about any axis must also be zero. Accordingly, where one or more items are placed atop a storage system of the present disclosure or removed therefrom, a mass or a weight of an item disposed on the storage system may be identified by determining a sum of the forces sensed by each of the load sensors, and a location of the item on a shelf or another inventory location may be determined based on known distances between pairs of the load sensors. Where two or more pairs of load sensors provide support to a platform, a mass or a weight of an item disposed on the storage system may be identified by determining a sum of the forces sensed by each of the load sensors, and a location of the item may be determined based on known distances between each of any pair of the load sensors.

The load sensors of the present disclosure may incorporate any type or form of systems for sensing loading on a platform or other surface. A load cell may be a transducer that converts a sensed mechanical force into a measurable electrical signal. In some implementations, the load cells may be strain-gage load cells including a plurality of strain gages that are bonded onto a beam or structural member that deforms when weight is applied thereto. An extent of strain may be measured by determining a change in resistance when a force is applied to a carrier matrix, which is bonded to a surface. The strain gages included in a load cell may be configured to sense both tension and compression in the beam or structural member, and may include multiple strain gages to improve their sensitivity to load and to compensate for temperature variations within a vicinity of the load cell. When a load cell is subjected to loads, strain on the load cell causes electrical resistance of the strain gages to vary in proportion to the loads.

The systems and methods of the present disclosure may be incorporated into any number, type or size of storage system having any number, type or size of inventory locations, e.g., platforms or other storage systems, that are supported in any manner. The storage systems disclosed herein may determine weights of items placed onto such shelves, or removed from such shelves, and enable such items to be identified or located based on such weights. In this regard, a traditional storage system may be converted into a "smart" storage system using one or more of the systems or methods disclosed herein, while still maintaining a look and feel of the traditional storage system, and without requiring the installation of scales distributed throughout one or more shelving units. Alternatively, one or more of the storage systems disclosed herein may be manufactured or assembled to include the load sensors, power sources or other components disclosed herein.

Those of ordinary skill in the pertinent art will further recognize that the term "weight" refers to a force applied to a given mass by acceleration due to gravity, or approximately 32 feet per second per second (32 ft/s$^2$), or 9.8 meters per second per second (9.8 m/s$^2$), which is substantially constant all over the surface of the planet Earth. Because weight is directly proportional to mass, the terms "weight" and "mass" may be used interchangeably throughout the present disclosure.

Figure 2A:
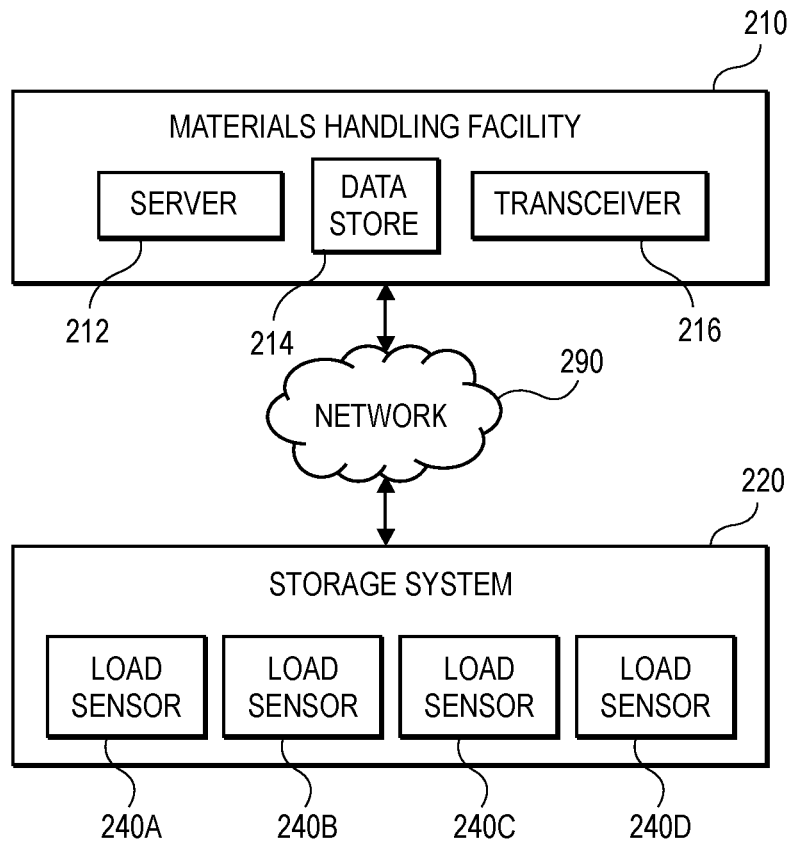
FIGS. 2A and 2B are block diagrams of components of one system in accordance with implementations of the present disclosure.
Figure 2B:
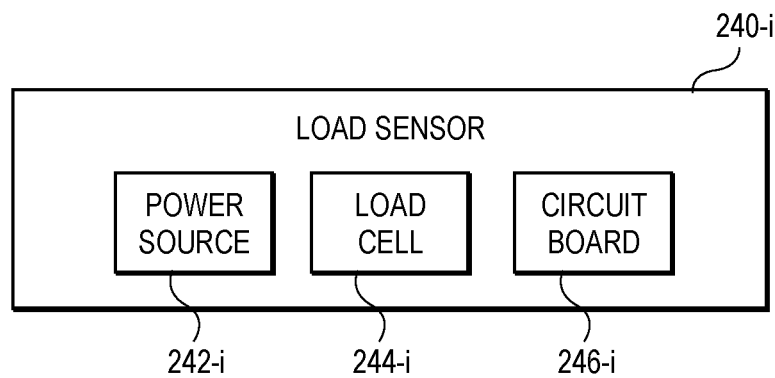

Referring to FIGS. 2A and 2B, block diagrams of components of one system in accordance with implementations of the present disclosure is shown. Except where otherwise noted, reference numerals preceded by the number "2" shown in FIGS. 2A and 2B indicate components or features that are similar to components or features having reference numerals preceded by the number "1" shown in FIGS. 1A through 1I.

As is shown in FIG. 2A, a system 200 includes a materials handling facility 210 having a server 212, a data store 214 and a transceiver 216, as well as a storage system 220 having a plurality of load sensors 240A, 240B, 240C, 240D that are connected to the server 212 or to one another across a network 290, which may include the Internet in whole or in part. The system 200 of FIG. 2A may include any number of materials handling facilities 210, each having any number of storage systems 220, and each of such storage systems 220 in any of the materials handling facilities may have any number of load sensors 240A, 240B, 240C, 240D, in accordance with implementations of the present disclosure.

The materials handling facility 210 may be any facility that is adapted to receive, store, process and/or distribute items from a variety of sources to a variety of individuals, e.g., as a bricks-and-mortar retail establishment, or to a variety of destinations, e.g., on behalf of or for an electronic marketplace, or on behalf of or for any other entity. The materials handling facility 210 may be configured to receive any type or kind of inventory items from various sources, to store the inventory items until a user orders or retrieves one or more of the items, or to distribute the inventory items to the user. For example, inventory items such as merchandise, commodities, perishables or any other type of item may be received from one or more suppliers, e.g., manufacturers, distributors, wholesalers, vendors or the like, at the materials handling facility 210. Upon their arrival at the materials handling facility 210, the inventory items may be prepared for storage, such as by unpacking or otherwise rearranging the inventory items, and updating one or more records to reflect the types, quantities, conditions, costs, locations or any other parameters associated with the inventory items. Subsequently, the inventory items may be stocked, managed or dispensed in terms of countable, individual units or multiples of units, such as packages, cartons, crates, pallets or other suitable aggregations. Alternatively, one or more of the items, such as bulk products, commodities, or the like, may be stored in continuous or arbitrarily divisible amounts or volumes that may not be inherently organized into countable units, and may instead be managed in terms of measurable quantities such as units of length, area, volume or weight, or other dimensional properties characterized by units of measurement.

When a request or an order specifying one or more of the inventory items is received, or as a user progresses through the materials handling facility 210, inventory items that are listed in the request or order, or are desired by the user, may be selected or "picked" from an inventory area at the materials handling facility 210. For example, in one implementation, a customer or other user may travel through the materials handling facility 210 with a list (e.g., a paper list, or a handheld mobile device displaying or including a virtual or electronic list) and may pick one or more of the inventory items from an inventory area at the materials handling facility 210. In other implementations, an employee of the materials handling facility 210 or another user (e.g., a customer) may pick one or more inventory items, as may be directed by one or more written or electronic pick lists derived from orders. In some instances, an inventory item may be retrieved and delivered to a customer or another user who placed a request for the inventory item. In other instances, the inventory item may require repositioning from one location within an inventory area to another location. For example, in some instances, an inventory item may be picked from a first inventory location (e.g., a first inventory shelf or other storage system) in an inventory area, moved a distance, and placed at a second inventory location (e.g., a second inventory shelf or other storage system) in the inventory area.

As is shown in FIG. 2A, the materials handling facility 210 includes a networked computer infrastructure for performing various computer-related functions associated with the receipt, storage, processing and distribution of such items, including one or more of the physical computer servers 212, the data stores (e.g., databases) 214 and/or the transceivers 216, that may be provided in the same physical location as the materials handling facility 210, or in one or more alternate or virtual locations, e.g., in a "cloud"-based environment. In some implementations, the servers 212, the data stores 214 and/or the transceivers 216 or any number of other computing devices or resources may further execute any type of computer-based function or compute any type or form of calculation, including but not limited to any formulas, equations, algorithms or techniques for determining one or more probabilities or performing any number of statistical tests. In some implementations, the servers 212, the data stores 214 and/or the transceivers 216 may be configured to execute one or more machine learning tools, systems or techniques.

The transceiver 216 may be configured to enable the materials handling facility 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 216 may further include or be in communication with one or more input/output (or "I/O") interfaces, network interfaces and/or input/output devices, and may be configured to allow information or data to be exchanged between one or more of the components of the materials handling facility 210, or to one or more other computer devices or systems (e.g., other aerial vehicles, not shown) via the network 290. For example, in some implementations, the transceiver 216 may be configured to coordinate I/O traffic between the server 212 or the data store 214 and the storage system 220 or the load sensors 240A, 240B, 240C, 240D. The transceiver 216 may perform any necessary protocol, timing or other data transformations in order to convert data signals from a first format suitable for use by one component into a second format suitable for use by another component. In some implementations, the transceiver 216 may include support for devices attached through various types of peripheral buses, e.g., variants of the Peripheral Component Interconnect (PCI) bus standard or the USB standard. In some other implementations, functions of the transceiver 216 may be split into two or more separate components, or integrated with the server 212.

In addition to the load sensors 240A, 240B, 240C, 240D, the storage system 220 may further include any number of surfaces, such as a platform, a bar or a hook, for accommodating one or more inventory items thereon, and the load sensors 240A, 240B, 240C, 240D may be provided in association with such surfaces to detect loading thereon and to generate one or more electrical load signals consistent with forces associated with masses or weights of the inventory items. In some implementations, the storage system 220 may be associated with an inventory location such as a shelf, a table or another system having a surface for accommodating items thereon. In such implementations, the storage system 220 may include a platform placed atop the one or more load sensors 240A, 240B, 240C, 240D, such as is shown in FIGS. 1A through 1I, thereby enabling the storage system 220 to be incorporated quickly, inexpensively and effectively. Alternatively, the storage system 220 may be an integrated system that includes one or more surfaces for accommodating items and the load sensors 240A, 240B, 240C, 240D incorporated therein. Regardless of form, platforms, bars, hooks or other loading surfaces of the storage system 220 may be aligned horizontally, e.g., flat, or at any non-horizontal angle. Additionally, the storage system 220 may further include any structural components associated with such platforms or loading surfaces, or the load sensors 240A, 240B, 240C, 240D, including but not limited to the table 115 of the storage system 120 shown in FIGS. 1A through 1I, or any other components.

The load sensors 240A, 240B, 240C, 240D may be any device that is configured to generate and transfer electrical load signals corresponding to forces sensed from dead and live loads at respective points of the storage system 220, e.g., on one or more surfaces for accommodating items thereon, with such forces including a mass or a weight of a platform, a bar, a hook, or another loading surface along with weights of one or more items placed thereon. In some implementations, the load sensors 240A, 240B, 240C, 240D may be configured for placement beneath or in association with a platform or another loading surface for accommodating items thereon that is placed atop an existing storage system, e.g., an inventory location such as a shelf, a table or another surface. In some other implementations, one or more of the load sensors 240A, 240B, 240C, 240D may be integral components of the storage system 220, and mounted therein in association with a platform, a bar, a hook or another loading surface for accommodating items thereon.

A representative one of the load sensors 240A, 240B, 240C, 240D is shown as a load sensor 240-i in FIG. 2B. The load sensor 240-i of FIG. 2B includes a power source 242-i, a load cell 244-i and a circuit board 246-i, which may be disposed in a common housing of any size or shape. The power source 242-i may be any type or form of battery, fuel cell or other system for generating power for supporting operations of the load sensor 240-i. In some implementations, the power source 242-i may be a standard battery, such as a size AA battery, a size AAA battery, a size C battery, a size D battery, a coin-cell battery (e.g., a CR 2016, a CR 2025 or a CR 2032), or any other battery. The load cell 244-i may be any system for generating electrical load signals corresponding to forces applied to the load sensor 240-i. In some implementations, the load cell 244-i may be a strain-gage load cell, which may include conductive elements such as aluminum, copper and/or silicon provided in strings or grids that are configured to sense changes in electrical resistance in response to physical loading. In some other implementations, the load cell 244-i may include one or more capacitive sensors, force-sensing resistors, inductive weight sensors, or any other type or form of device or system for generating electrical load signals in response to loading thereon.

The circuit board 246-i may include any components for controlling operations of the load sensor 240-i or interpreting information or data captured thereby. Such components may include one or more processors, transistors, transducers, transceivers or any other components. For example, the circuit board 246-i may include a converter, e.g., an analog-to-digital converter, for converting signals generated by the load cell 244-i to one or more other forms, such as from analog signals to digital signals, prior to transmitting such signals to another computer device or system. Such converters may include, but are not limited to, a direct-conversion converter, a successive-approximation converter, a ramp-compare converter, an integrating converter, a sigma-delta converter, or any other analog-to-digital converter. Alternatively, in some implementations, a single, common converter or like component may be provided to convert signals generated by one or more load cells into another form, e.g., from analog signals to digital signals.

For example, in some implementations, the circuit board 246-i may include one or more transceivers for communicating with other load sensors 240-i, or with one or more external computer devices or systems, over the network 290. Such transceivers may be configured for communication via one or more wired or wireless means, e.g., wired technologies such as USB or fiber optic cable, or standard wireless protocols such as Bluetooth® or any Wi-Fi protocol, such as over the network 290 or directly. For example, in some implementations, the circuit board 246-i may enable the load sensor 240-i to communicate over the network 290 via or within any wireless band, including but not limited to a 5.0 gigahertz (GHz) band, or a 2.4 gigahertz (GHz) band. In some other implementations, the circuit board 246-i may enable the load sensor 240-i to communicate over the network 290 via or within a wireless band of less than 1.0 gigahertz (GHz).

In some implementations, each of the load sensors 240-*i* may include a corresponding power source 242-*i*. In some other implementations, one or more of the load sensors 240-*i* may not include an intrinsic power source, but may be electrically coupled to another component, e.g., another load sensor, and may receive electrical power from the other component. Additionally, each of the load sensors 240-*i* may be in communication with the server 212 by wired or wireless means, or with one or more external computer devices or systems, e.g., over the network 290, in order to transmit or receive information in the form of digital or analog data by any wired or wireless technologies or protocols, or for any other purpose.

Although the system 200 of FIG. 2A includes a single box corresponding to one materials handling facility 210, a single box corresponding to one storage system 220, and four boxes corresponding to four load sensors 240A, 240B, 240C, 240D, those of ordinary skill in the pertinent arts will recognize that the materials handling facility 210 may include any number of the storage systems 220, and each of such storage systems 220 may include any number of load sensors 240A, 240B, 240C, 240D. Furthermore, each of the storage systems 220 may be homogenous, such that each includes the same number and type of load sensors and surfaces for accommodating items, or heterogeneous in nature, such that one or more of the storage systems 220 includes a number or type of load sensors or a surface for accommodating items that are different from a number or type of load sensors or a surface for accommodating items of one or more other storage systems 220 in accordance with the present disclosure.

In addition to the storage system 220, the materials handling facility 210 may include any number of other inventory areas or facilities having predefined two-dimensional or three-dimensional storage systems for accommodating items and/or containers of such items, such as aisles, rows, bays, shelves, slots, bins, racks, tiers, bars, hooks, cubbies or other like storage means, or any other appropriate regions or stations, which may be flat or angled, stationary or mobile, and of any shape or size. Additionally, as is discussed above, the materials handling facility 210 may further include one or more receiving stations featuring any apparatuses that may be required in order to receive shipments of items at the materials handling facility 210 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The materials handling facility 210 may further include one or more distribution stations where items that have been retrieved from a designated inventory area may be evaluated, prepared and packed for delivery from the materials handling facility 210 to addresses, locations or destinations specified by customers, also by way of carriers such as cars, trucks, trailers, freight cars, container ships or cargo aircraft (e.g., manned aircraft or unmanned aircraft, such as drones).

Alternatively, an item received at a receiving station of the materials handling facility 210 may be transferred directly to a distribution station for further processing, or "cross-docked," without first being placed into storage in an intermediate inventory area. The materials handling facility 210 may also include one or more additional stations for receiving and distributing items to customers, as well as one or more conveying systems, autonomous mobile robots, or other manual or automated vehicles for transporting items between such stations or areas (not shown in FIG. 2A or 2B). The materials handling facility 210 may operate one or more order processing and/or communication systems using computer devices or resources in communication with one or more of the servers 212, the data stores 214 and/or the transceivers 216, or through one or more other computing devices or resources that may be connected to the network 290, in order to transmit or receive information in the form of digital or analog data, or for any other purpose.

The materials handling facility 210 may also include any number of other sensors, components or other features for detecting one or more events or interactions therein, including one or more imaging devices, RFID sensors, LIDAR sensors, or any other type or form of sensors. Information or data captured by a variety of sensors may be independently or collectively evaluated in order to determine a measure of a probability or likelihood that an event has occurred at a specific location, and processed according to one or more of the systems or methods disclosed herein if an event is determined to have occurred, to a predetermined level of confidence or accuracy, or discarded when it is determined that no event has occurred. Likewise, a location or a time of an event may be determined based on information or data captured by any of such sensors, which may be independently or collectively evaluated in order to identify the location or the time at which the event has most likely occurred.

The materials handling facility 210 may also include one or more other components or features for controlling or aiding in the operation of the materials handling facility 210, including but not limited to one or more thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), laser sensors, weight sensors, attitude indicators, depth gauges, accelerometers, or sound sensors (e.g., microphones, piezoelectric sensors, vibration sensors or other transducers for detecting and recording acoustic energy from one or more directions).

The materials handling facility 210 may also include one or more human operators (not shown), such as one or more workers, who may be any designated personnel tasked with performing one or more tasks within the materials handling facility 210 in general, or within one or more inventory areas, receiving stations, distribution stations or other locations of the materials handling facility 210 in particular. Such operators may handle or transport items (e.g., any type or form of good, product, media or other tangible consumer article) within the materials handling facility 210, or operate one or more pieces of equipment therein (not shown). Such operators may also operate one or more specific computing devices or resources for registering the receipt, retrieval, transportation or storage of items within the materials handling facility 210, e.g., a general purpose device such as a personal digital assistant, a digital media player, a smartphone, a tablet computer, a desktop computer or a laptop computer (not shown), which may include any form of input and/or output peripherals such as scanners, readers, keyboards, keypads, touchscreens or like devices. Alternatively, the one or more human operators may include customers of the materials handling facility 210.

In some implementations, information or data captured using the load sensors 240A, 240B, 240C, 240D or any other components of the materials handling facility 210 and/or the storage system 220 may be utilized in concert with information or data captured or generated by a locating service having one or more processors or sensors for detecting the presence or absence of one or more actors within the materials handling facility 210, and locating one or more poses, gestures or other actions executed by such actors within the materials handling facility 210. Such a locating service may be provided in the same physical location as the materials handling facility 210 or in one or more alternate or virtual locations, e.g., in a "cloud"-based environment.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some implementations, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and other resources described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method (e.g., speech recognition or gesture recognition devices or techniques) to interact with the computers, servers, devices and the like, or to "select" an item, link or any other aspect of the present disclosure.

Those of ordinary skill in the pertinent arts will understand that process steps described herein as being performed by or in a "materials handling facility," or by or in a "storage system," or like terms, may be automated steps performed by their respective computer devices or resources, or implemented within software modules (or computer programs) executed by one or more general purpose computers. Those of ordinary skill in the pertinent arts would also recognize that process steps described as being performed by a "materials handling facility," a "customer," or a "data processing system," or like terms, may be typically performed by a human, but could, alternatively, be performed by an automated agent. Some protocols or components for providing communication between the materials handling facility 210, the storage system 220 and/or any of the load sensors 240A, 240B, 240C, 240D are well known to those skilled in the art of computer communications and need not be described in more detail herein.

The data and/or computer executable instructions, programs, firmware, software and the like (also referred to herein as "computer executable" components) described herein may be stored on a transitory and/or non-transitory computer-readable medium that is within or accessible by computers or computer components such as the servers 212, the data stores 214, the transceiver 216, or the load sensors 240A, 240B, 240C, 240D and having sequences of instructions which, when executed by a processor (e.g., a central processing unit, or "CPU," or a graphics processing unit, or "GPU"), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
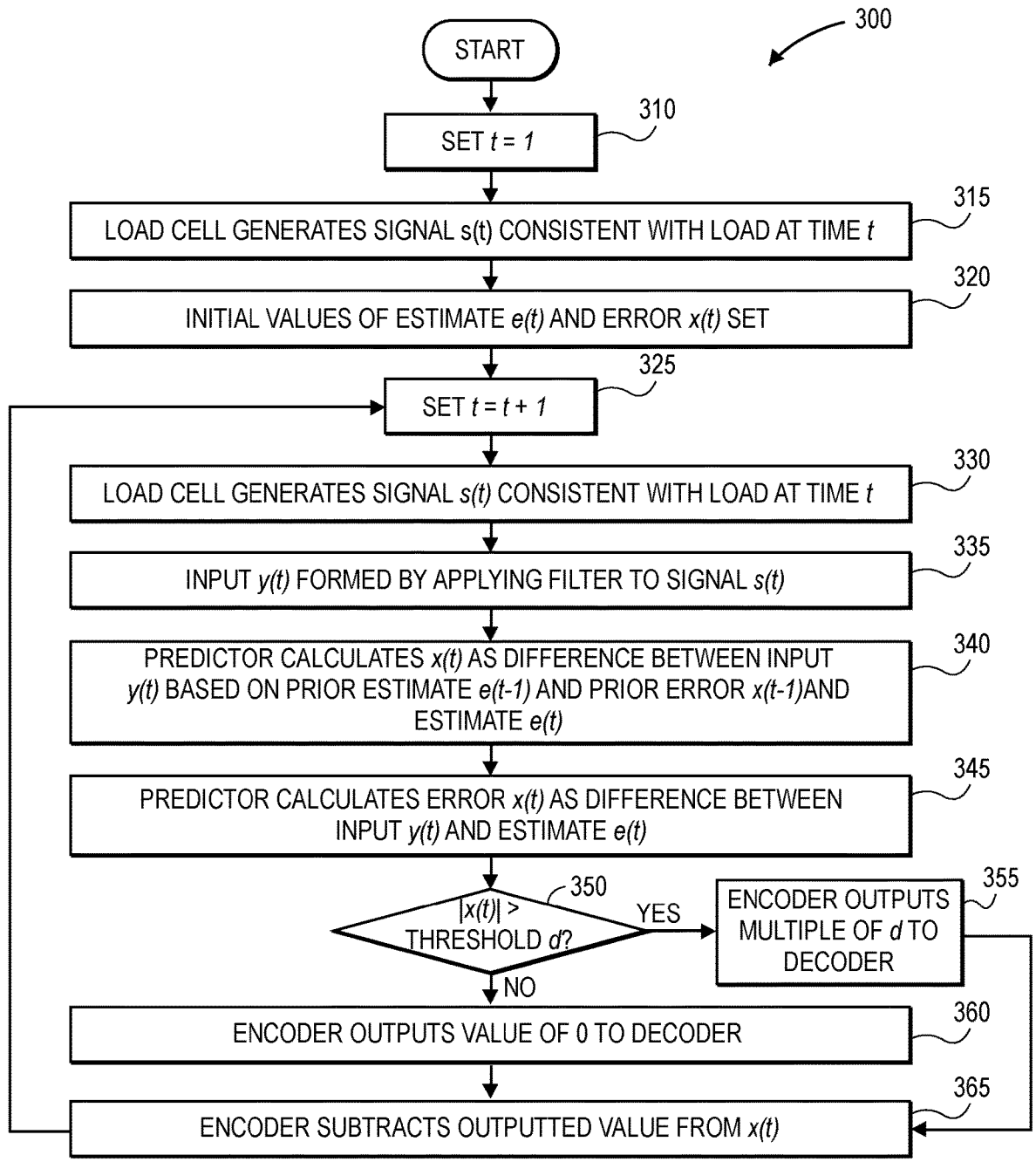
FIG. 3 is a flow chart of one process in accordance with implementations of the present disclosure.

Referring to FIG. 3, a flow chart 300 of one process in accordance with implementations of the present disclosure is shown. At box 310, a value of a step variable t is set equal to one. The step variable t may represent a single time in a series or sequence, such as with respect to a sampling rate of a load sensor, or may cover or include an interval of such times.

At box 315, a load cell generates a signal s(t) consistent with a loading condition thereon at the time t. For example, the load cell may be a capacitive sensor, a force-sensing resistor, a strain gage load cell, a piezoelectric sensor, an inductive weight sensor, or any other type or form of device or system for generating electrical load signals in response to loading thereon. The load cell may be a component of a load sensor and included in a common housing with one or more power sources (e.g., batteries) or circuit components (e.g., a circuit board including one or more transmitters or transceivers). The load cell may be placed in contact with a loading surface and one or more components of a storage system on which the loading surface is intended to rest. In some implementations, such as where the signal s(t) is an analog signal, the signal s(t) may be converted, e.g., by an analog-to-digital converter.

At box 320, initial values of an estimate e(t) of a value of the signal s(t) and an error x(t) associated with the signal s(t) are set at the time t. The values of the estimate e(t) and the error x(t) may be initialized in any manner, such by designating the estimate e(t) as the signal s(t), which may be filtered or unfiltered, or setting an error x(t) of zero. Alternatively, the values of the estimate e(t) and the error x(t) may be initialized in any other manner.

At box 325, the value of the step variable t is incremented by one, or is set equal to t+1. At box 330, the load cell generates another signal s(t) consistent with a loading condition thereon at the time t. The increment may be a fixed interval of time, such that the step variable t represents a next time in a series or sequence of times, or a reciprocal of a sampling rate, or any other measure of time. For example, in some implementations, the load cell may be programmed or configured to generate a signal representative of a respective loading condition on the load cell at a regular interval of time, e.g., every ten milliseconds, or for a regular duration, e.g., two milliseconds, and the value of the step variable t or the increment may be selected based on the interval or duration.

At box 335, an input y(t) representative of the signal s(t) generated at the time t is formed by applying a filter to the signal s(t) generated at the time t. For example, in some implementations, a low-pass filter, such as an eighth-order Bessel infinite initial response (or "IIR") filter having any cutoff frequency, may be applied to a raw load cell signal. In some implementations, the low-pass filter may have a cutoff frequency of approximately 3.5 Hz, which may remove from the signal s(t) some effects of vibration or other events that may be encountered during operations.

At box 340, a predictor calculates an estimate e(t) of the input y(t) at the time t based on the estimate e(t−1) and the error x(t−1) calculated at a previous time (t−1). In some implementations, the estimate e(t) may be calculated based on a product of a constant α and the estimate calculated at the previous time (t−1), or αe(t−1). The constant α may be selected based on one or more attributes of the load sensor, or of a shelf or other storage system with which the load cell is associated, and may have a value of approximately one, or less than or greater than one. Moreover, in some implementations, the constant α may be varied or adapted in a manner consistent with changes in loading conditions sensed by the load cell. Moreover, where the value of the error x(t−1) calculated at the previous time (t−1) is zero, a value of the estimate is determined solely based on the estimate e(t−1) calculated at the previous time (t−1), or the product of the constant α and the estimate e(t−1) calculated at the previous time (t−1). At box 345, the predictor calculates an error x(t) at the time t as a difference between the input y(t) at the time t generated at box 335 and the estimate e(t) at the time t calculated at box 340, or x(t)=y(t)−e(t). The error x(t) may be a static error, or a measure of how close a reconstructed, compressed signal may be to the input y(t).

At box 350, whether an absolute value of the error x(t) is greater than a threshold d, or whether |x(t)|>d, is determined. If the absolute value of the error x(t) is greater than the threshold d, the process advances to box 355, where an encoder outputs a signal having a value in a multiple of the threshold d to a decoder, e.g., a positive or a negative value representative of a whole number of the thresholds d. For example, if the absolute value of the error x(t) is greater than the threshold d, but is less than twice the threshold d, then the encoder will output one value of the threshold d to the decoder over one or more networks. A fractional portion of value of the error x(t), e.g., a difference (or a residual) between x(t) and the threshold d, or x(t)−d, is not outputted to the encoder. Likewise, if the absolute value of the error x(t) is substantially greater than the threshold d, e.g., by a whole number n of values of the threshold d, but less than a whole number (n+1) of values of the threshold d, then the encoder will output n values of the threshold d to the decoder over the one or more networks, and a fractional portion of value of the error x(t), e.g., a difference (or a residual) between x(t) and n values of the threshold d, or x(t)−n d, is not outputted to the encoder. The value in the multiple of the threshold d may be positive or negative, depending on whether the value of the error x(t) is positive or negative.

In some implementations, the value may be transmitted in the multiple of the threshold d as a stream of bits, or a stream of sets of bits, which may be encoded in a binary code that may include one or more features or values for representing negative values or numbers of zeroes in series in the stream. For example, the value in the multiple of the threshold d may be represented as a single set of up to eight bits, or multiple sets of up to eight bits each, corresponding to values that, when added or aggregated, equal one or more values of the threshold d. The decoder may be operated on an external system, such as a server or another computer device or system maintained within a materials handling facility in which the load cell is located, or in one or more alternate or virtual locations, e.g., in a "cloud"-based environment. The decoder may be configured to interpret a net change in loading based on one or more signals received from the encoder, e.g., signals representing zeroes or multiples of the threshold d.

If the absolute value of the error x(t) is not greater than the threshold d, then the process advances to box 360, where the encoder outputs a signal having a value of zero to the decoder. In some implementations, the value of zero may be transmitted as a stream of bits, or a stream of sets of bits, which may be encoded in a binary code. Alternatively, where absolute values of the error x(t) are not greater than the threshold d for multiple consecutive times t or iterations, the encoder may output a stream of bits, or a stream of sets of bits, indicating values of zero for each of the consecutive times t or iterations.

In accordance with implementations of the present disclosure, the predictor that calculates the estimate e(t) at box 340 or the error x(t) at box 345 may be associated with the encoder that outputs the values at box 355 or box 360, or a separate entity, and may be embodied in a set of code executed by one or more processors, or any software module or hardware component. Likewise, the decoder that receives the values outputted by the encoder at box 355 or at box 360 may be embodied in a set of code executed by one or more processors, or any software module or hardware component, of a different system than the predictor or the encoder.

After the encoder has outputted a value to the decoder, e.g., a multiple of the threshold d at box 355 or zero at box 360, the process advances to box 365, where the encoder subtracts the outputted value from the error x(t), before returning to box 325, where the value of the step variable t is incremented by one, or is set equal to t+1. The portion of the error x(t) that is not transmitted to the encoder, e.g., a difference between the error x(t) and the multiple of the threshold d if the absolute value of the error x(t) is greater than the threshold d, or the entire value of the error x(t) if the absolute value of the error x(t) is less than the threshold d, may then be accumulated and carried forward for use in calculating the estimate e(t) at box 340 in subsequent iterations.

Where a storage system includes multiple load cells (e.g., multiple load sensors having such load cells), the process represented in the flow chart 300 of FIG. 3 may be performed by each of such cells independently or collectively. Moreover, values that are outputted by each of such cells and received by a decoder following the outputting steps of box 355 or box 360 may be interpreted in the same manner that the values were encoded and added to determine an amount of a change in loading conditions on the load cell. Masses or weights of items placed on a storage system or removed therefrom may be determined based on a sum of forces represented in values received by the decoder from all of the load sensors of a storage system. For example, a net increase represented by the outputs indicates an increase in a total mass of items on a storage system, while a net decrease represented by the outputs indicates a decrease in a total mass of items on the loading system.

A transaction may be identified based on the extent of a change in loading, which may be compared against an index, record or look-up table stored in a database or other data store in order to identify one or more items that may have been removed from a storage system or placed onto the storage system. The transaction may be associated with a customer within a vicinity of a storage system, e.g., by updating a data file or record regarding items associated with the customer to indicate that the one of the items is now associated with the customer and is no longer stored on the storage system, or that one of the items is now stored on the storage system and is no longer associated with the customer. Furthermore, locations of the items may be determined based on sums of forces represented in values received by the decoder from pairs of the load sensors, as well as distances between the pairs of the load sensors, according to standard equilibrium principles.

A value of a constant by which an estimate (or a prediction) of a load signal determined at a previous time is multiplied, viz., the constant α referenced above with respect to box 340, may be selected to impart a decay factor with respect to errors that accumulate over time. Where the value of the constant equals one, no decay is imparted, and prior estimates (or predictions) of load signals have neither an increased nor a decreased effect on a subsequent calculation of an estimate (or a prediction). Where the value of the constant is greater than one, however, a subsequently calculated estimate (or prediction) is greater than if the estimate had been calculated based on the prior estimate (or prediction) alone. Conversely, where the value of the constant is less than one, a subsequently calculated estimate (or prediction) is less than if the estimate (or prediction) had been calculated based on the prior estimate (or prediction) alone. An encoder and a decoder may each be programmed with the same value of the constant, in order to ensure that the encoding and decoding of values is performed consistently by each of the encoder and the decoder.

Figure 4A:
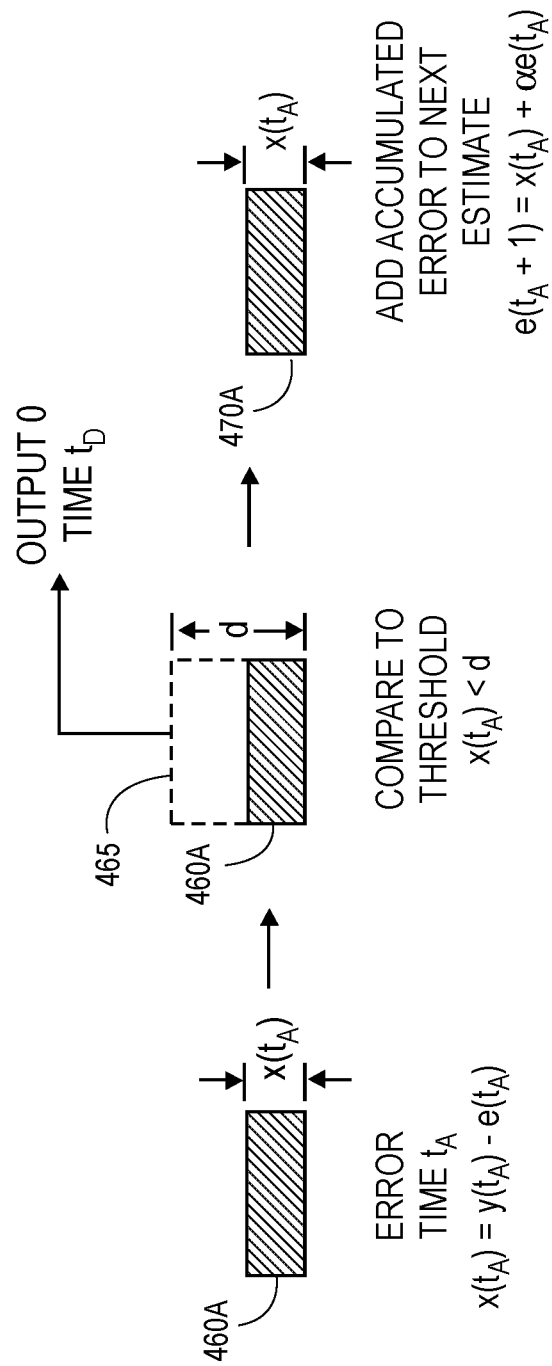
FIGS. 4A through 4C are views of aspects of one or more implementations of the present disclosure.
Figure 4B:
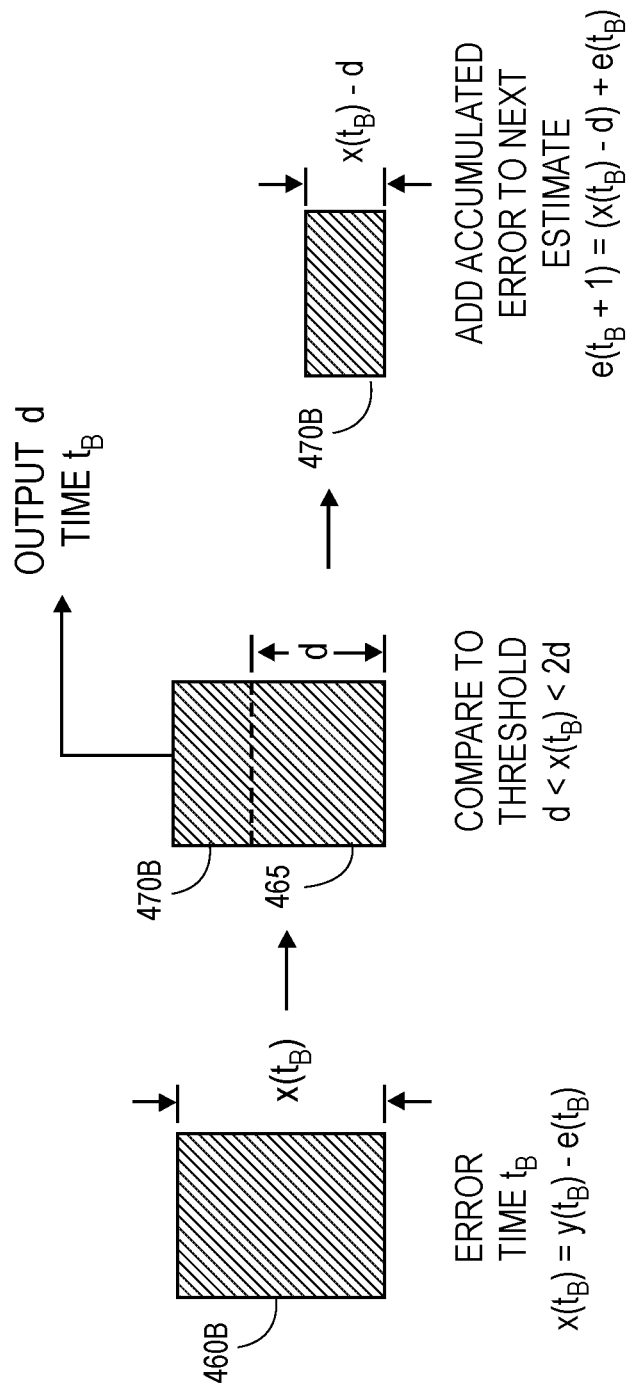
Figure 4C:
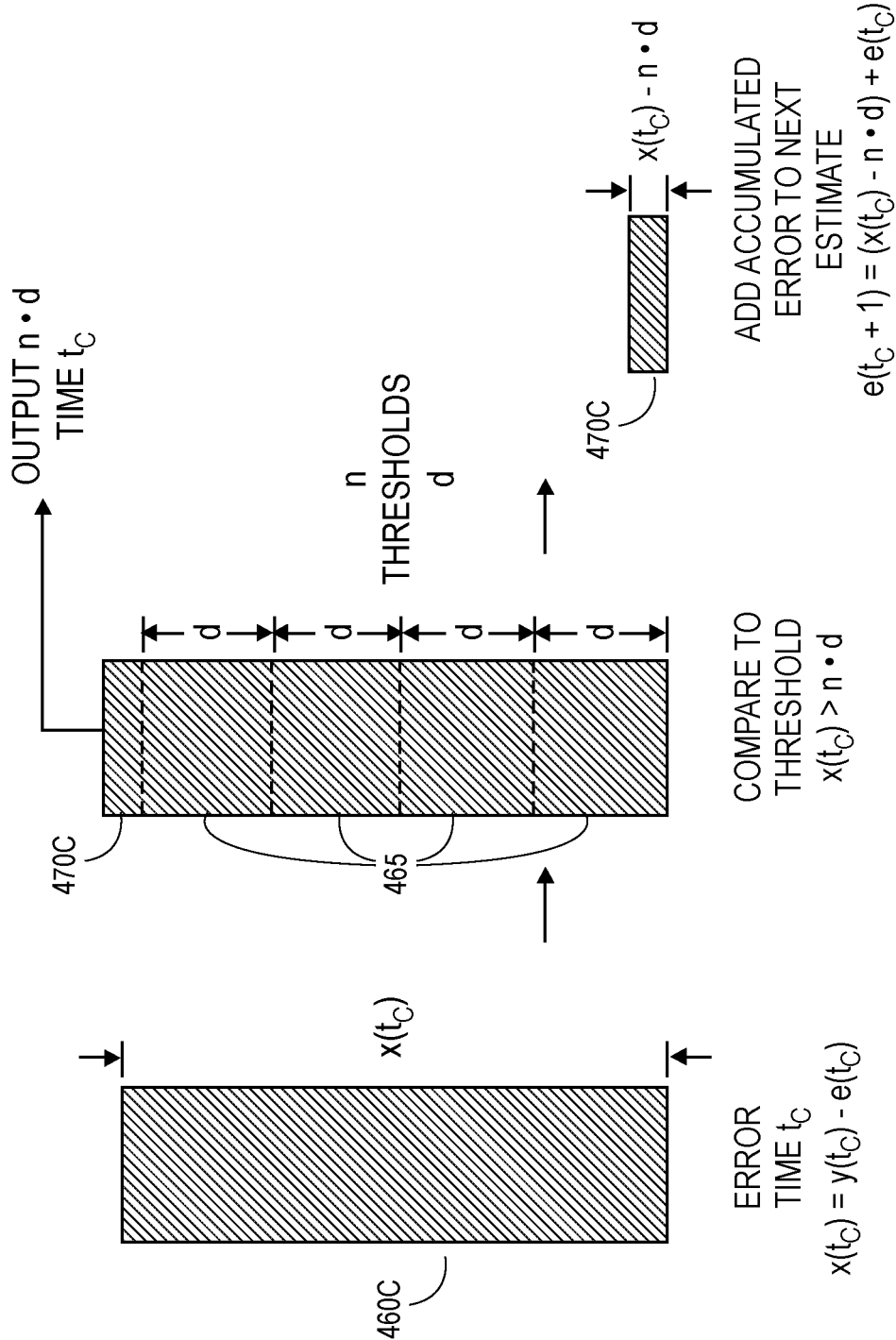

As discussed above, amounts of errors in excess of a multiple of a threshold may be aggregated and carried forward by incorporating the excess amounts of such errors into a calculation of an estimated value of a load signal to be received at a next time. Referring to FIGS. 4A through 4C, views of aspects of one or more implementations of the present disclosure are shown. Except where otherwise noted, reference numerals preceded by the number "4" shown in FIGS. 4A through 4C indicate components or features that are similar to components or features having reference numerals preceded by the number "2" shown in FIGS. 2A and 2B, or by the number "1" shown in FIGS. 1A through 1I.

As is shown in FIG. 4A, an error 460A at a time $t_A$, or $x(t_A)$, is calculated as a difference between an input value $y(t_A)$, e.g., a converted and/or filtered value of a load signal captured at time $t_A$, and an estimate of the input value $e(t_A)$, or $x(t_A)=y(t_A)-e(t_A)$. The error 460A is subsequently compared to a threshold 465, or d.

Where the value of the error 460A is less than the threshold 465, or where $x(t_A)<d$, a value of 0 is outputted to a decoder at time $t_A$. A difference 470A (or a residual) between the error 460A and the outputted value, e.g., an entire value $x(t_A)$ of the error 460A, is accumulated and added to a next estimate of a value of a load signal to be subsequently calculated at a time $t_A+1$, or $e(t_A+1)=x(t_A)+e(t_A)$.

By outputting a value of zero and transmitting the value to a decoder, an encoder may reduce not only an amount of bandwidth occupied by the transmission of data but also an amount of data to be processed by the decoder. Moreover, by accumulating errors that are neither outputted nor transmitted, e.g., the entire value $x(t_A)$ of the error 460A shown in FIG. 4A, the encoder may ensure that errors that are not substantial with respect to the threshold are still preserved for further consideration. If such errors are temporary or cyclic in nature, e.g., due to vibration, shocks or other effects, the errors may dissipate or reverse themselves in due course.

As is shown in FIG. 4B, an error 460B at a time $t_B$, or $x(t_B)$, is calculated as a difference between an input value $y(t_B)$, e.g., a converted and/or filtered value of a load signal captured at time $t_B$, and an estimate $e(t_B)$ of the input value, or $x(t_B)=y(t_B)-e(t_B)$. The error 460B is subsequently compared to a threshold 465, or d.

Where the value of the error 460B is greater than the threshold 465 but less than twice the threshold 465, or where $d<x(t_B)<2d$, a value of the threshold 460, or d, is outputted to a decoder at time $t_B$. Likewise, a difference 470B (or a residual) between the error 460B and the outputted value, or $x(t_B)-d$, is accumulated and added to a next estimate of a value of a load signal to be subsequently calculated at a time $t_B+1$, or $e(t_B+1)=(x(t_B)-d)+e(t_B)$. The difference $x(t_B)-d$ is not ignored or discarded, but is instead considered with respect to an input value of a load signal subsequently received at a next time.

As is shown in FIG. 4C, an error 460C at a time $t_C$, or $x(t_C)$, is calculated as a difference between an input value $y(t_C)$, e.g., a converted and/or filtered value of a load signal captured at time $t_C$, and an estimate $e(t_C)$ of the input value, or $x(t_C)=y(t_C)-e(t_C)$. The error 460C is subsequently compared to a threshold 465, or d.

Where the value of the error 460C is greater than a multiple of the threshold 465, e.g., greater than n values of the threshold d, or where $x(t_C)>n \cdot d$, n values of the threshold 460, or n·d, are outputted to a decoder at time $t_C$. Likewise, a difference 470C (or a residual) between the error 460C and the outputted value, or $x(t_C)-n \cdot d$, is accumulated and added to a next estimate of a value of a load signal to be subsequently calculated at a time $t_C+1$, or $e(t_C+1)=(x(t_C)-n \cdot d)+e(t_C)$. Like the difference $x(t_B)-d$ shown in FIG. 4B, the difference $x(t_C)-n \cdot d$ is not ignored or discarded, but is instead considered with respect to an input value of a load signal subsequently received at a next time.

As is discussed above, in some implementations, streams of bits may be encoded in a binary code, in a manner similar to or inspired by Golomb coding, and may include one or more features or values for representing negative values or numbers of zeroes included in the stream. Referring to FIGS. 5A through 5D, views of aspects of one or more implementations of the present disclosure are shown. Except where otherwise noted, reference numerals preceded by the number "5" shown in FIGS. 5A through 5D indicate components or features that are similar to components or features having reference numerals preceded by the number "4"

shown in FIGS. 4A through 4C, by the number "2" shown in FIGS. 2A and 2B, or by the number "1" shown in FIGS. 1A through 1I.

Figure 5A:
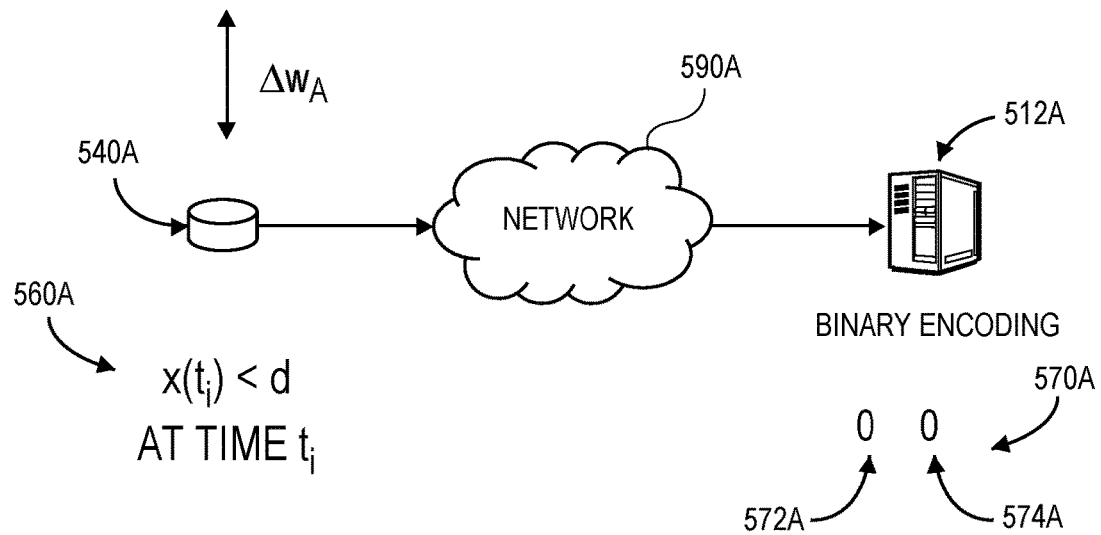
FIGS. 5A through 5D are views of aspects of one or more implementations of the present disclosure.

In some implementations, when a value to be transmitted by a load sensor to an external system is zero, the value may be encoded in a binary code as a set of bits including a zero as a first digit, signifying that the set of bits represents a value of zero. As is shown in FIG. 5A, a change in loading $\Delta w_A$ On a load sensor 540A is observed at a time $t_i$. An error 560A (or a difference) $x(t_i)$ between a value of a load signal generated by the load sensor 540A at the time $t_i$ and an estimated value of the load signal is determined to be less than a threshold d. The load sensor 540A then transmits a set of bits 570A including a first digit 572A of zero and a second digit 574A of zero to a server 512A (or other external computer device or system) over one or more networks 590A. The first digit 572A indicates that the value represented by the set of bits 570A is zero, while the second digit 574A indicates that the set of bits represents a value of zero at a single time, viz., the time $t_i$.

Figure 5B:
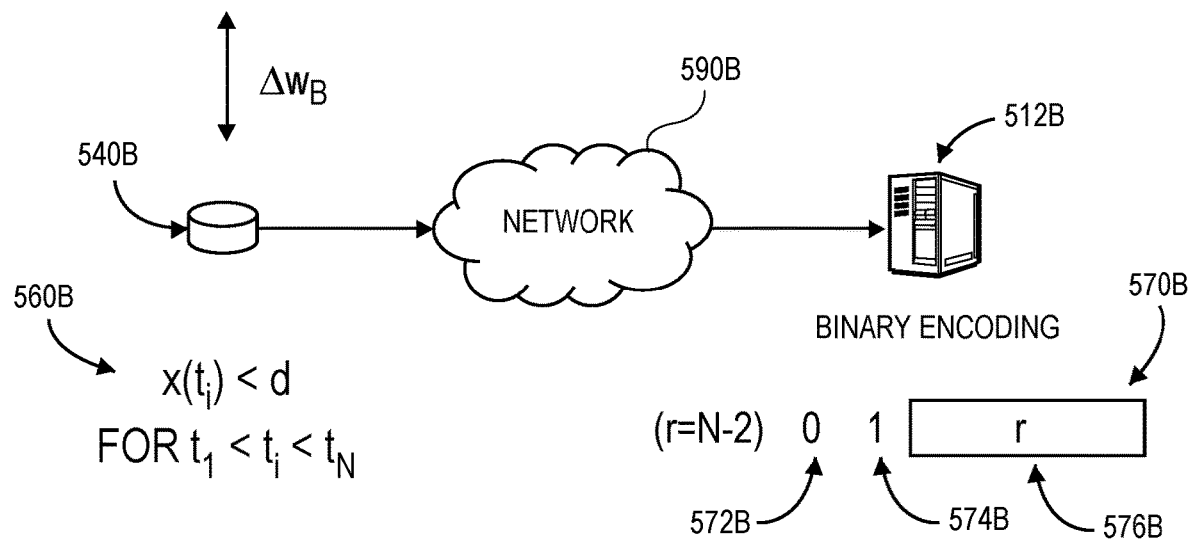

Additionally, the binary code may further indicate a number of values of zero that are represented in a single set of bits. As is shown in FIG. 5B, changes in loading $\Delta w_B$ on a load sensor 540B are observed at times $t_i$ over a range of times between $t_1$ and $t_N$. Errors 560B (or differences) $x(t_i)$ calculated between values of load signals generated by the load sensor 540B over the times $t_i$ over a range of times between $t_1$ and $t_N$ and estimated values of the load signals are determined to be less than a threshold d. The load sensor 540B then transmits a set of bits 570B including a first digit 572B of zero, a second digit 574B of one, and a radix r of digits 576B thereafter, to a server 512B (or other external computer device or system) over one or more networks 590B. The first digit 572B indicates that the value represented by the set of bits 570B is zero, while the second digit 574B indicates that the set of bits represents a value of zero for more than a single time, viz., the times $t_i$ between $t_1$ and $t_N$. The radix r of digits 576B indicates a number of consecutive values of zero (e.g., an insubstantial change in loading on the load sensor 540B) represented by the set of bits 570B. For example, where the radix r may include up to six digits following the first digit 572B and the second digit 574B, the six digits may be used to indicate that the set of bits 570B represents up to sixty-four values of zero in series, e.g., from 000000 to 111111. Alternatively, the radix r may have any number of digits other than six, and the set of bits 570B may represent up to any number $N=2^r$ of values of zero in series.

Figure 5C:
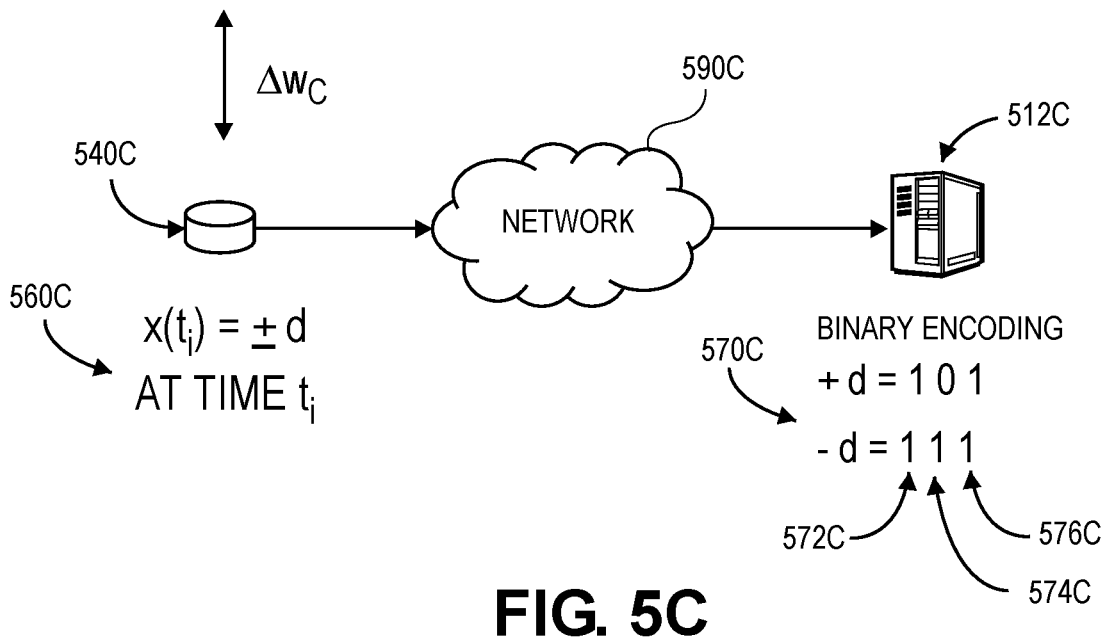

In some implementations, when a value to be transmitted by a load sensor to an external system is non-zero, e.g., a positive value or a negative value in excess of a threshold, the value may be encoded in a binary code as a set of bits including a one as a first digit, signifying that the set of bits represents a non-zero value. As is shown in FIG. 5C, a change in loading $\Delta w_C$ on a load sensor 540C is observed at a time $t_i$. An error 560C (or a difference) $x(t_i)$ between a value of a load signal generated by the load sensor 540C at the time $t_1$ and an estimated value of the load signal is determined to be a single unit of a threshold d, e.g., an increase or a decrease in loading equal to the threshold d. The load sensor 540C then transmits a set of bits 570C including a first digit 572C of one, a second digit 574C of zero or one, and a third digit 576C of one to a server 512C (or other external computer device or system) over one or more networks 590C. The first digit 572C indicates that the value represented by the set of bits 570C is non-zero, viz., positive or negative, while the third digit 576C indicates a multiple of the threshold d (e.g., a number of the thresholds d) represented by the set of bits 570C, viz., one. The second digit 574C is zero if the change in loading represented by the set of bits 570C is positive and one if the change in loading represented by the set of bits 570C is negative.

Figure 5D:
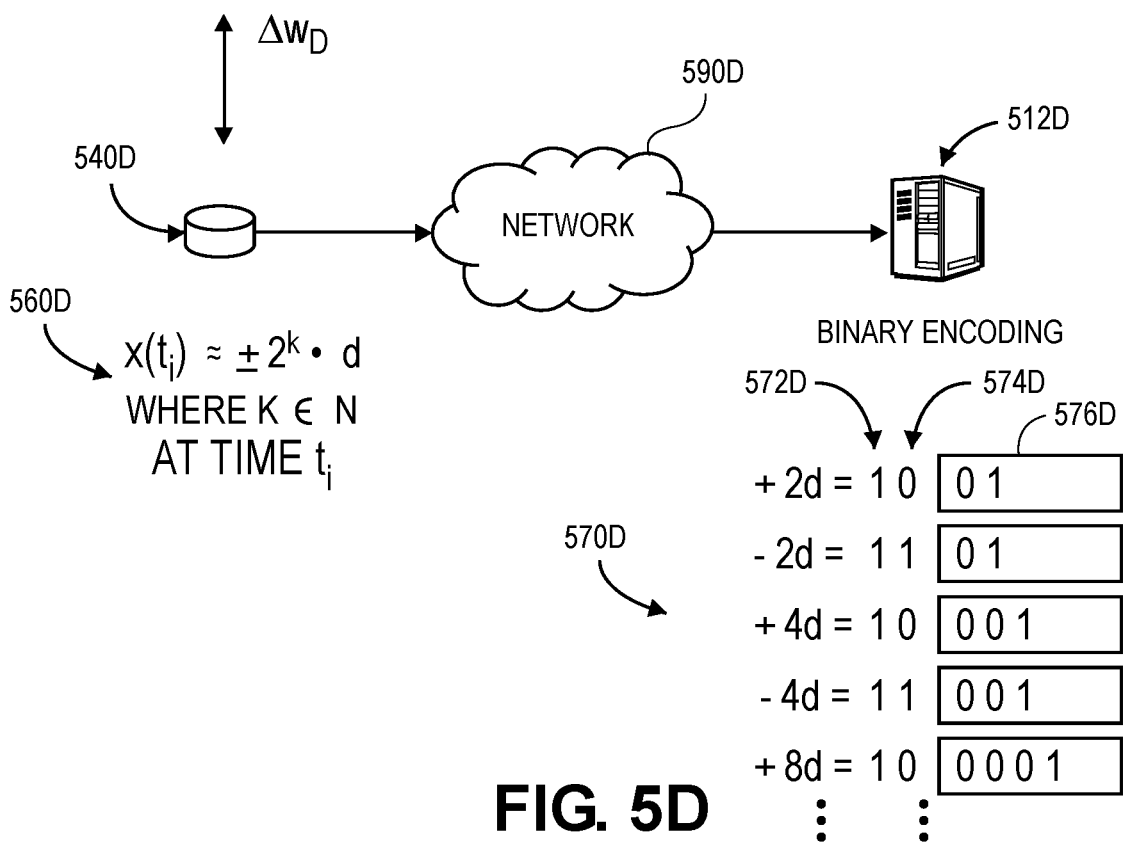

Additionally, the binary code may further indicate any multiple of a threshold (e.g., any number of the thresholds) that are represented in a single set of bits. As is shown in FIG. 5D, a change in loading $\Delta w_D$ on a load sensor 540D is observed at a time $t_i$. An error 560D (or a difference) $x(t_i)$ between a value of a load signal generated by the load sensor 540D at the time $t_i$ and an estimated value of the load signal is determined to exceed a multiple of a threshold d, e.g., an increase or a decrease in loading equal to a number $\pm 2^K$ of the thresholds d, where K is a counting number (or a positive integer). The load sensor 540D then transmits a set of bits 570D including a first digit 572D of one, a second digit 574D of zero or one, and a plurality of digits 576D defined by a value to be represented by the set of bits 570D, to a server 512D (or other external computer device or system) over one or more networks 590D. The first digit 572D indicates that the value represented by the set of bits 570D is non-zero, viz., positive or negative, while the second digit 574D is zero if the change in loading represented by the set of bits 570D is positive and one if the change in loading represented by the set of bits 570D is negative.

The multiple of the threshold d, or the number of the thresholds d, represented in the set of bits 570D defines the number of digits in the plurality of digits 576D, which include a number of zeroes K followed by a one, where $2^K$ is the number of multiples to be represented in the set of bits 570D. For example, as is shown in FIG. 5D, where the multiple of the threshold d represented in the set of bits 570D is two, e.g., an increase or decrease by an amount of two of the threshold d, or where K=1, such that $2^K=2$, the plurality of digits 576D include a single zero and a one in series. Where the multiple of the threshold d represented in the set of bits 570D is four, e.g., an increase or decrease by an amount of four of the threshold d, or where K=2, such that $2^K=4$, the plurality of digits 576D include two zeroes and a one in series. Where the multiple of the threshold d represented in the set of bits 570D is eight, e.g., an increase or decrease by an amount of eight of the threshold d, or where K=3, such that $2^K=8$, the plurality of digits 576D include three zeroes and a one in series, and so on and so forth. The set of bits 570D shown in FIG. 5D enables the load sensor 540D to transmit code representing a change in loading in any multiple of the threshold d, or in any numbers of the threshold d.

Figure 6A:
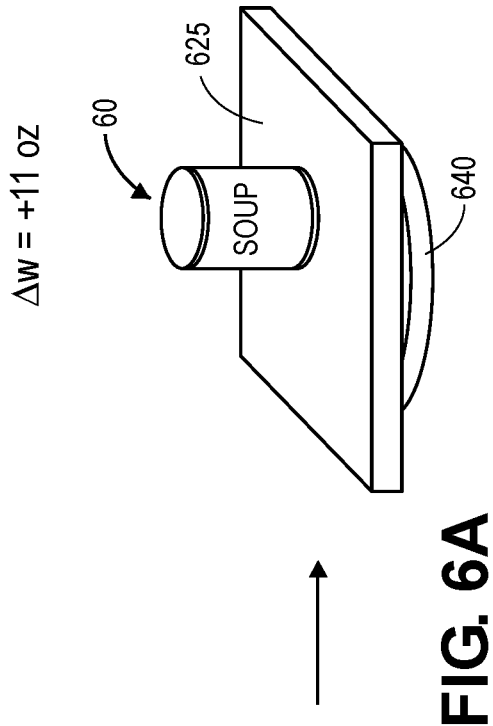
FIGS. 6A and 6B are views of aspects of one or more implementations of the present disclosure.
Figure 6A:
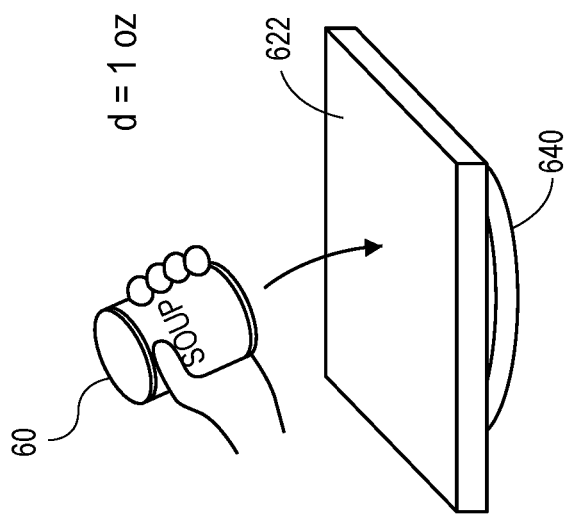
Figure 6B:
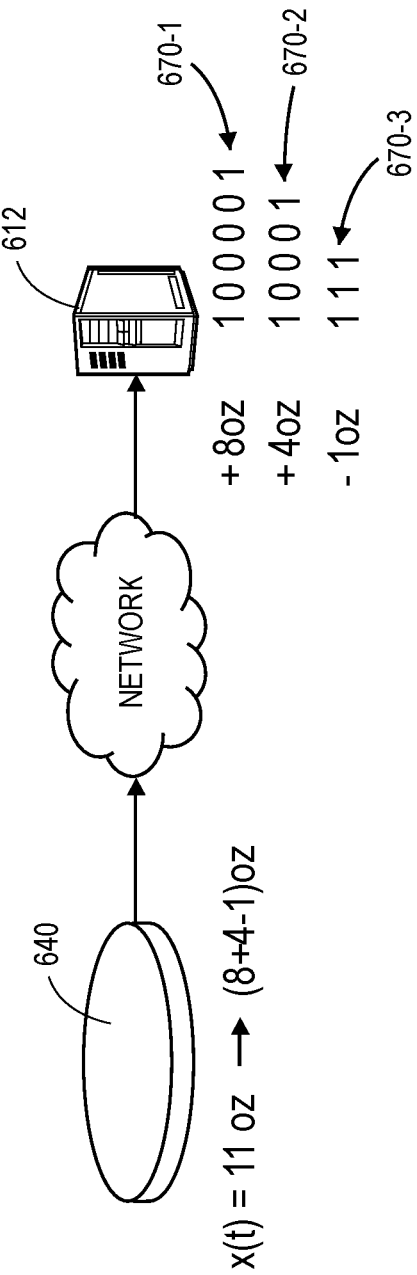

Moreover, a load sensor may transmit any number of sets of bits in binary code to represent any value of a change in loading on the load sensor. Referring to FIGS. 6A and 6B, views of aspects of one or more implementations of the present disclosure are shown. Except where otherwise noted, reference numerals preceded by the number "6" shown in FIGS. 6A and 6B indicate components or features that are similar to components or features having reference numerals preceded by the number "5" shown in FIGS. 5A through 5D, by the number "4" shown in FIGS. 4A through 4C, by the number "2" shown in FIGS. 2A and 2B, or by the number "1" shown in FIGS. 1A through 1I.

As is shown in FIG. 6A, where an eleven-ounce can 60 of soup is placed on a platform 622 provided on a load sensor 640 having a threshold d of one ounce, the loading on the load sensor 640 increases by a weight Aw of eleven ounces.

As is shown in FIG. 6B, the load sensor 640 determines an error x(t) in an amount of eleven ounces, which exceeds the threshold d of one ounce. Accordingly, the load sensor 640 transmits three sets 670-1, 670-2, 670-3 of bits to an external system 612 to indicate the change in loading on the platform 622. Each of the sets 670-1, 670-2, 670-3 of bits is encoded in a binary code, such as is described above with regard to FIGS. 5A through 5D, and represents a value that, when added, equals the total number of thresholds d represented by the change in weight Aw, or eleven. The sets 670-1, 670-2, 670-3 of bits may then be interpreted by a decoder operated by the external system 612 to determine a value of the change in weight Aw.

For example, a first set 670-1 of bits representing eight thresholds d includes a first digit of one indicating that the value represented in the first set 670-1 is non-zero and a second digit of zero indicating that the value represented in the first set 670-1 is positive. The first set 670-1 of bits further includes three zeroes and a one, indicating that the value represented in the first set 670-1 is two to a power of three multiples, or eight multiples, of the threshold d.

A second set 670-2 of bits representing four thresholds d includes a first digit of one indicating that the value represented in the second set 670-2 is non-zero and a second digit of zero indicating that the value represented in the second set 670-2 is positive. The second set 670-2 of bits further includes two zeroes and a one, indicating that the value represented in the second set 670-2 is two to a power of two multiples, or four multiples, of the threshold d.

A third set 670-3 of bits representing four thresholds d includes a first digit of one indicating that the value represented in the third set 670-3 is non-zero, a second digit of zero indicating that the value represented in the third set 670-3 is negative, and a third digit of one indicating that the value represented in the third set 670-3 is a single multiple of the threshold d.

Thus, the external system 612 may decode the sets 670-1, 670-2, 670-3 of bits and sum the values represented therein, viz., eight plus four minus one, to determine that a value of the change in weight Aw is eleven thresholds d.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. Although some of the implementations of storage systems disclosed herein may be implemented within a fulfillment center or another materials handling facility, those of ordinary skill in the pertinent arts will recognize that the systems and methods of the present disclosure are not so limited, and may be utilized in connection with the placement, storage or distribution of items from storage systems provided in any environment or for any purpose.

For example, although some implementations of storage systems of the present disclosure are referenced as providing support for discrete, homogenous items (e.g., in one or more dedicated locations or spaces on storage systems, such as lanes or blocks), those of ordinary skill in the pertinent arts will recognize that such storage systems and/or inventory areas may accommodate any type, form or number of items, and in any location or space thereon, irrespective of any attribute or category of such items.

Moreover, those of ordinary skill in the pertinent arts will further recognize that any type, form or number of storage systems may be provided singly or in tandem for the purpose of supporting one or more items thereon. As is discussed above, and used herein, a "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose. Likewise, the systems and methods of the present disclosure may also be utilized outside of a traditional materials handling facility environment. For example, when utilized in a home, a plurality of storage systems in accordance with the present disclosure may be installed in a kitchen, a pantry, a garage, a shed or a work area, to support items thereon and track their respective arrival or departure. Additionally, declensions, conjugations or other forms of the word "predict" (e.g., "predicted," "prediction," "predicting") and the word "estimate" (e.g., "estimated," "estimation," "estimating") are used interchangeably herein.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the processes shown in the flow chart of FIG. 3, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A method for tracking items in a materials handling facility, wherein the materials handling facility comprises:
   a computer system;
   a storage system comprising:
      a platform having a plurality of items thereon; and
      a plurality of load sensors disposed beneath the platform, wherein each of the plurality of load sensors comprises:
         a battery;
         a load cell configured to generate load signals corresponding to a load; and
         a wireless transmitter configured to transmit the load signals to the computer system; and
   wherein the method comprises:
      generating, by a first load sensor of the plurality of load sensors, a first load signal corresponding to a load applied to the first load sensor at a first time;
      determining, by the first load sensor, an estimated value of the load applied to the first load sensor at the first time based at least in part on an estimated value of a load applied to the first load sensor prior to the first time;
      calculating, by the first load sensor, a first error based at least in part on a difference between the load applied to the first load sensor at the first time and the estimated value of the load applied to the first load sensor at the first time;
      determining, by the first load sensor, that an absolute value of the first error exceeds a threshold;
      in response to determining that the absolute value of the first error exceeds the threshold,
         selecting, by the first load sensor, at least a first set of bits based at least in part on a difference between the absolute value of the first error and the threshold, wherein the first set of bits is encoded according to a binary code,
            wherein a first digit of the first set of bits is one,
            wherein the second digit of the first set of bits is zero if the value of the first error is positive,
            wherein the second digit of the first set of bits is one if the value of the first error is negative, and
            wherein a last digit of the first set of bits is one;
      transmitting, by the first load sensor to the computer system, at least the first set of bits;
      determining, by the computer system, a value of a change in load on the platform based at least in part on the first set of bits; and
      identifying, by the computer system, at least one item based at least in part on the change in load.

2. The method of claim 1, further comprising:
   generating, by the first load sensor, load signals corresponding to loads applied to the first load sensor at a plurality of times prior to the first time;
   determining, by the first load sensor, estimated values of the loads applied to the first load sensor at each of the plurality of times;
   calculating, by the first load sensor, a plurality of errors based at least in part on the loads applied to the first load sensor and the estimated values of the loads applied to the first load sensor;
   determining that values of each of the plurality of errors are zero;
   selecting, by the first load sensor, at least a second set of bits based at least in part on the errors, wherein the second set of bits is encoded according to the binary code,
      wherein a first digit of the first set of bits is zero,
      wherein a second digit of the first set of bits is one, and
      wherein a plurality of digits following the second digit represent values of zero for each of the plurality of errors according to the binary code;
   transmitting, by the first load sensor to the computer system, at least the second set of bits; and
   determining, by the computer system, that the load on the platform did not change for at least the plurality of times prior to the first time based at least in part on the second set of bits.

3. The method of claim 1, wherein the first load sensor comprises an analog-to-digital converter, and
   wherein generating the first load signal comprises:
      generating, by the first load sensor, a second load signal corresponding to the load applied to the first load sensor at the first time, wherein the second load signal is an analog signal; and
      converting, by the first load sensor, the second load signal to a digital signal,
   wherein the first load signal is the digital signal.

4. The method of claim 3, further comprising:
   filtering, by the first load sensor, the digital signal by a low-pass filter,
   wherein the low-pass filter is an eighth-order Bessel infinite initial response filter having a cut-off frequency of approximately three-and-one-half hertz.

5. A method comprising:
   determining, by a first load sensor, a first estimated value of a load applied to the first load sensor at a first time;
   determining, by the first load sensor, a second measured value indicative of a load applied to the first load sensor at a second time, wherein the second time follows the first time;
   calculating, by the first load sensor, a second estimated value of the load applied to the first load sensor at the second time, wherein the second estimated value is calculated based at least in part on the first estimated value;
   calculating, by the first load sensor, a first error based at least in part on a difference between the second measured value and the second estimated value;
   determining, by the first load sensor, that the first error is less than a predetermined threshold;

in response to determining that the first error is less than the predetermined threshold, transmitting, by the first load sensor, at least a first set of bits to a computer system over one or more networks, wherein the first set of bits represents at least a value of zero at the first time;

determining, by the first load sensor, a third measured value indicative of a load applied to the first load sensor at a third time, wherein the third time follows the second time;

calculating, by the first load sensor, a third estimated value of the load applied to the first load sensor at the third time, wherein the third estimated value is calculated based at least in part on the second estimated value and the first error;

calculating, by the first load sensor, a second error based at least in part on a difference between the third measured value and the third estimated value;

determining, by the first load sensor, that the second error is not less than the predetermined threshold;

in response to determining that the second error is not less than the predetermined threshold;

transmitting, by the first load sensor, at least a second set of bits to the computer system over one or more networks, wherein the second set of bits represents at least one multiple of the predetermined threshold; and calculating, by the computer system, a change in the load applied to the first load sensor based at least in part on the value represented by the second set of bits.

6. The method of claim 5, wherein the first load sensor comprises an analog-to-digital converter, and wherein determining the second measured value comprises:

generating, by the first load sensor, a load signal representative of the load applied to the first load sensor at the second time, wherein the load signal is an analog signal; and converting, by the first load sensor, the load signal to a digital signal, wherein the second measured value indicative of the load applied to the first load sensor at the second time is determined based at least in part on the digital signal.

7. The method of claim 6, further comprising:

filtering, by the first load sensor, the digital signal by a low-pass filter to the digital signal, wherein the low-pass filter has a cut-off frequency of approximately three-and-one-half hertz.

8. The method of claim 7, wherein the low-pass filter is an eighth-order Bessel infinite initial response filter.

9. The method of claim 5, wherein each of the first set of bits and the second set of bits is encoded using a binary code having at least a first digit and a second digit, and wherein the first digit of the binary code is a zero if a value encoded in a set of bits is zero, and wherein the first digit of the binary code is a one if the value encoded in the set of bits is not zero.

10. The method of claim 9, wherein the second digit of the first set of bits is a zero.

11. The method of claim 9, further comprising:

calculating, by the first load sensor, a plurality of errors based at least in part on differences between a plurality of measured values indicative of loads applied to the first load sensor at times preceding the first time and a plurality of estimated values of the loads applied to the first load sensor at the times preceding the first time;

determining, by the first load sensor, that each of the plurality of errors is less than the predetermined threshold;

selecting, by the first load sensor, the first set of bits based at least in part on the plurality of errors and the first error, wherein the first set of bits indicates that the loads applied to the first load sensor are unchanged at each of the times preceding the first time, wherein the first digit of the first set of bits is a zero, wherein the second digit of the first set of bits is a one, and wherein a radix of digits following the second digit of the first set of bits represents a number of the values of zero at each of the times preceding the first time and the value of zero at the first time.

12. The method of claim 9, wherein an absolute value of the second error is greater than one multiple of the predetermined threshold and less than two multiples of the predetermined threshold, wherein the first digit of the second set of bits is a one, wherein the second digit of the second set of bits is a zero if the value of the second error is positive and a one if the value of the second error is negative, and wherein a last digit of the second set of bits is a one.

13. The method of claim 9, wherein an absolute value of the second error is approximately equal to a multiple of the predetermined threshold, wherein the first digit of the second set of bits is a one, wherein the second digit of the second set of bits is a zero if the value of the second error is positive and a one if the value of the second error is negative, wherein a last digit of the second set of bits is a one, and wherein the multiple is equal to two to a power of a number of digits between the second digit of the second set of bits and the last digit of the second set of bits.

14. The method of claim 5, wherein the first load sensor comprises:

a battery;

a load cell configured to generate load signals corresponding to a load supplied to the first load sensor;

at least one processor; and a wireless transmitter configured to transmit the load signals to the computer system.

15. The method of claim 5, wherein the first load sensor is one of a plurality of load sensors provided in association with a loading surface at a materials handling facility.

16. The method of claim 15, wherein the change in the load applied to the first sensor is negative, and wherein the method further comprises:

identifying an item based at least in part on the change in load; and storing an indication that one of the item has been removed from the loading surface.

17. The method of claim 15, wherein the change in the load applied to the first sensor is positive, and wherein the method further comprises:

identifying an item based at least in part on the change in load; and storing an indication that one of the item has been added to the loading surface.

18. A method comprising:

determining, by a first load sensor, a first estimated value of a load applied to the first load sensor at a first time;

determining, by the first load sensor, a second measured value indicative of a load applied to the first load sensor at a second time, wherein the second time follows the first time;

calculating, by the first load sensor, a second estimated value of the load applied to the first load sensor at the second time, wherein the second estimated value is calculated based at least in part on the first estimated value;

calculating, by the first load sensor, a first error based at least in part on a difference between the second measured value and the second estimated value;

determining, by the first load sensor, that an absolute value of the first error is at least a first multiple of a predetermined threshold;

in response to determining that the absolute value of the first error is at least the first multiple of the predetermined threshold, transmitting, by the first load sensor, at least a first set of bits to a computer system over one or more networks, wherein the first set of bits represents the first multiple of the predetermined threshold, wherein the first set of bits is encoded using a binary code having a first digit, a second digit, a first number of digits in series and a last digit in series, and wherein the first digit is a one, wherein the second digit is a one if the first error is positive and a zero if the first error is negative, wherein the first multiple equals a base of two to a first exponent, wherein the number of digits between the second digit and the last digit is an integer equal to the first exponent, and wherein the last digit is a one; and calculating, by the computer system, a change in the load applied to the first load sensor based at least in part on the first set of bits; and identifying, by the computer system, an item based at least in part on the change in load applied to the first load sensor.

19. The method of claim 18, wherein determining that the absolute value of the first error is at least the first multiple of the predetermined threshold further comprises:

determining that the absolute value of the first error is a sum of the first multiple of the predetermined threshold and a second multiple of the predetermined threshold; and transmitting, by the first load sensor, at least a second set of bits to a computer system over one or more networks, wherein the second set of bits represents the second multiple of the predetermined threshold, wherein the second set of bits is encoded using the binary code having a first digit, a second digit, a second number of digits and a last digit in series, and wherein the first digit is a one, wherein the second digit is a one if the first error is positive and a zero if the first error is negative, wherein the second multiple equals a base of two to a first exponent, wherein the second number of digits between the second digit and the last digit is an integer equal to the second exponent, and wherein the last digit is a one; and wherein the change in the load applied to the first load sensor is calculated based at least in part on the first set of bits and the second set of bits.

20. The method of claim 19, wherein each of the first load sensor and the second load sensor is provided in association with a loading surface at a materials handling facility, and wherein each of the first load sensor and the second load sensor comprises:

a battery;

a load cell configured to generate load signals corresponding to a load supplied to the load cell; and a wireless transmitter configured to transmit the load signals to the computer system.

* * * * *